US007924894B2

(12) United States Patent
Livingston

(10) Patent No.: US 7,924,894 B2
(45) Date of Patent: Apr. 12, 2011

(54) DIGITAL PISTON ERROR CONTROL FOR HIGH-POWER LASER SYSTEM EMPLOYING DIFFRACTIVE OPTICAL ELEMENT BEAM COMBINER

(75) Inventor: Peter M. Livingston, Palos Verdes Estates, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 168 days.

(21) Appl. No.: 12/009,459

(22) Filed: Jan. 18, 2008

(65) Prior Publication Data

US 2009/0185590 A1     Jul. 23, 2009

(51) Int. Cl.
*H01S 3/10* (2006.01)
*H01S 3/13* (2006.01)

(52) U.S. Cl. .................................... 372/29.023; 372/26
(58) Field of Classification Search .................... 372/26, 372/29.023

See application file for complete search history.

(56) References Cited

U.S. PATENT DOCUMENTS

| 7,502,395 | B2 * | 3/2009 | Cheng et al. ................. 372/32 |
| 7,729,398 | B2 | 6/2010 | Livingston |
| 7,733,930 | B2 | 6/2010 | Livingston |
| 2005/0201429 | A1 * | 9/2005 | Rice et al. ...................... 372/27 |
| 2007/0086010 | A1 * | 4/2007 | Rothenberg ................. 356/450 |
| 2007/0201795 | A1 * | 8/2007 | Rice et al. ...................... 385/39 |
| 2009/0134310 | A1 * | 5/2009 | Goodno ...................... 250/201.9 |
| 2009/0185176 | A1 * | 7/2009 | Livingston et al. ......... 356/237.2 |

* cited by examiner

*Primary Examiner* — Armando Rodriguez
(74) *Attorney, Agent, or Firm* — Carmen Patti Law Group, LLC

(57) ABSTRACT

A high-power laser system includes a laser master oscillator, a plurality of fiber laser amplifiers producing intermediate output beamlets, a diffractive optical element for combining the intermediate beamlets into a combined output beam, and a piston error controller for minimizing errors related to beam combination that may degrade the quality of the combined output beam. A piston error controller uses amplitude modulation based on Hadamard code words to tag each non-reference intermediate beamlet with a unique code sequence orthogonal to those used for the other beamlets. For each intermediate beamlet, the associated piston error contribution is recovered using a Hadamard decoder. A very small phase dither is also introduced to allow the sign or direction of the piston error to be recovered. The decoded piston error contribution is processed by a cascaded product detector unit to derive a piston error control signal, which is provided to a phase modulator to thereby adjust the phase of a beamlet and minimize the piston error contributed thereby.

25 Claims, 9 Drawing Sheets

$310 \sim T(x) = e^{i\phi(x)}$ $312 \sim \phi(x) = -1.663 \sin(2\pi f_0 x) + 0.667 \sin(2\pi f_1 x)$

DIGITAL PISTON ERROR CONTROL FOR HIGH-POWER LASER SYSTEM EMPLOYING DIFFRACTIVE OPTICAL ELEMENT BEAM COMBINER

TECHNICAL FIELD

This invention relates generally to lasers, and more particularly to arrays of fiber laser amplifiers in which multiple output beams from fiber amplifiers are combined to produce a higher-powered output beam.

BACKGROUND

Optical fiber laser amplifiers are a known technology for producing a coherent output beam of intermediate power. A variety of factors, including Stimulated Brillouin Scattering, four wave mixing, and optical damage, limit the output power of a single fiber amplifier to the range of several hundred watts. Although a laser of this power output may be useful in a variety of applications, other applications require higher output power than that available from a single fiber amplifier.

Higher powered laser systems have been constructed by assembling an array of fiber amplifiers driven by a master oscillator. The output beams from each of the fiber amplifiers are combined to produce a nominally single output beam. In general, in order for the combined beam to have good beam quality, the individual beams must be substantially parallel and collinear.

A variety of approaches have been used to combine the beams from multiple fiber amplifiers. Most of these employ lenses and prisms. One known approach employs a lenslet array, a precision-manufactured array of small lenses, typically on a single substrate, to combine the several beams into a single powerful beam.

The use of a lenslet array to combine the beams from several fiber amplifiers has several disadvantages. Systems using a lenslet array are difficult to align. Also, the lenslet array substantially attenuates each of the individual beams, because the individual beamlets unavoidably overfill the lenslet aperture and the interstitial space between the lenslets does not act as a lens. This insertion loss is sometimes referred to as a "fill-factor" power loss, and robs some of the output power of the amplifier array. The power lost in the lenslet array results in heating. It may therefore be necessary to cool the lenslet array. In addition, the lenslet array imprints the far-field pattern of the combined output beam with the Fourier transform of the lenslet array. This results in a loss of beam quality.

A diffractive optical element (DOE) may also be used to combine the beamlets from several fiber amplifiers into one output beam. A DOE is a special type of grating having a grating surface shape (i.e., grooves) constructed according to a particularly designed grating function. A DOE differs from a conventional grating in that the DOE grating is coarser (i.e., the spatial frequency of the grooves of the DOE is much lower), and the shape of the grooves in the DOE surface is important. The product of the grating groove frequency and the light wavelength of the beamlets to be combined defines a characteristic angle, or "eigenangle" measured with respect to the grating normal. Each beamlet to be combined by the DOE must impinge on the grating precisely at a multiple of the characteristic angle if the single combined beam is to have good beam quality and if no exiting satellite beamlets at other than normal incidence to the DOE are to be created. Moreover, the optical phase of each beamlet, measured relative to a central beamlet impinging normal to the DOE surface must either be zero or pi radians according to a certain recipe, in order that no exiting satellite beamlets are to be produced and that the central emerging beam have good beam quality. Deviation from this condition is termed "piston error".

It is preferable that all of the energy exiting the DOE beam combiner be concentrated into a single beam or lobe. Two factors controlling whether this occurs are: (1) phase or "piston" error, defined above, and (2) "tilt" error, whereby one or more beamlets are incident on the DOE at angles which deviate from the aforementioned eigenangles, the values of which are determined by the grating function and the wavelength of the light being combined.

If either piston error or tilt error are present, unwanted secondary beamlets or lobes appear at the exit of the DOE. The beamlets are oriented along eigenangles or exit "orders", again determined by the grating function and the wavelength of the light being combined as described above. This is undesirable because the secondary beamlet generation reduces power and beam quality in the central lobe. In addition, if enough energy is present in the secondary beamlets, the stray beamlets may heat or damage objects or equipment. For laser systems of good mechanical stability, tilt error can generally be corrected adequately by careful alignment of the beamlets with respect to the DOE at the time of assembly or at the beginning of operation. However, the sources of piston error, including thermal processes, vary significantly and rapidly during operation of the laser system.

Thus, the need exists for a laser system having a plurality of fiber laser amplifiers, each producing an intermediate beamlet, and a diffractive optical element that combines the intermediate beamlets to form an output beam, which laser system substantially minimizes piston error with respect to the beamlets incident on the diffractive optical element.

SUMMARY

An improved high-power laser system includes a laser master oscillator, a plurality of fiber laser amplifiers producing intermediate output beamlets, a diffractive optical element for combining the intermediate beamlets into a combined output beam, and a piston error controller for minimizing errors related to beam combination that may degrade the quality of the combined output beam. A diffractive optical element (DOE) is a special type of coarse grating having a specifically designed grating profile or shape, which is capable of combining the plurality of intermediate beamlets into a single combined output beam, provided that, inter alia: (1) the intermediate beamlets are incident on the DOE face at prescribed angles ("eigenangles") determined by physical characteristics of the grating and the wavelength of the beams being combined; and (2) the intermediate beamlets arrive at the DOE face in phase, or 180 degrees out of phase, according to a certain recipe. Tilt error is failure of condition (1). Piston error is failure of condition (2). Either error causes the emission from the DOC of undesired secondary or "satellite" beamlets which rob power from and reduce the quality of the desired primary combined output beam.

A piston error controller provides for each intermediate beamlet a tagging signal used to amplitude-modulate the beamlet before combination. The amplitude modulation tags each beamlet (other than a defined reference beamlet) with a unique digitally-coded signal, such that after combination, contributions from such beamlet can be distinguished from those of other beamlets. A small sample of the output beam and any satellite beams is extracted for use in detecting these contributions. The satellite beamlets, to the extent present, appear as optical upper and lower sidebands on either side of the central lobe or primary output beam. A lens converges any satellite beams, including upper and lower sideband components, onto a detector array. The detector array effectively senses a double-sideband suppressed-carrier (DSSC) signal representing the combined piston error contributions from all intermediate beamlets. A DSSC processing circuit produces a signal representing the normalized difference of the energy in the upper and lower sidebands. Advantageously, no interferometer is required in order to detect piston error contributions from the intermediate beamlets.

For each non-reference beamlet, a corresponding decoder determines the amount of piston error artifact contributed by such beamlet. The result is a per-beamlet signal proportional to piston error. For each beamlet, a cascaded pair of synchronous detectors followed by an integrator generate a piston error correction estimate. Each piston error correction estimate is summed with a small phase dither and supplied to a phase modulator to correct the piston error. The phase dither allows the direction of the phase error to be determined.

The beamlet tagging signal may be produced by associating with each beamlet one or more unique code words or vectors from a Hadamard dictionary, replacing code vector elements of value 0 with the value −1, and selecting in turn individual elements of such code vector to control the modulator on a periodic basis. As is known in the art, a Hadamard code vector is orthogonal to all other non-identical Hadamard code vectors. As modified above, the sum of the elements in a Hadamard code vector is zero, and any two such vectors are orthonormal after normalization. These properties allow a signal encoded with a Hadamard code vector to be distinguishably decoded in the presence of other such signals.

The piston error control system advantageously minimizes the production of secondary beamlets exiting the DOE beam combiner, thereby maximizing the energy in the primary combined output beam and improving beam quality. The piston error control system is relatively resistant to crosstalk among beamlets; if crosstalk is present, due to the nature of the controllers as first-order servo-loops, the error will eventually converge to zero, albeit perhaps at a slower rate.

DESCRIPTION OF THE DRAWINGS

Features of example implementations of the invention will become apparent from the description, the claims, and the accompanying drawings in which:

DETAILED DESCRIPTION

Figure 1:
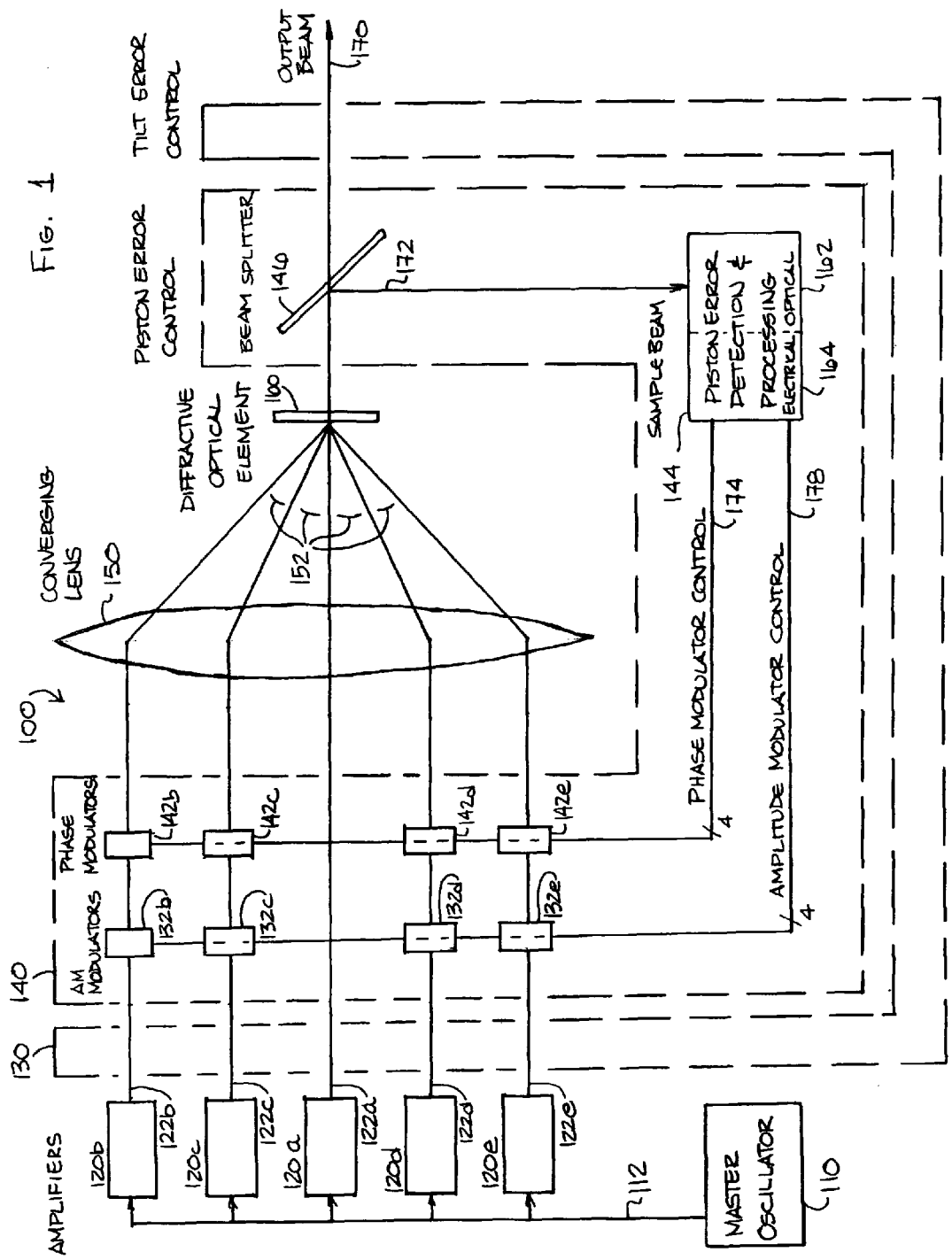
FIG. 1 is a block diagram of an example embodiment of a laser system 100 constructed according to an aspect of the present invention, in which a plurality of fiber laser amplifiers are used to amplify the beam from a master oscillator laser, and the outputs of the fiber laser amplifiers are combined using a diffractive optical element.

FIG. 1 is a block diagram of an example embodiment of a laser system 100 constructed according to an aspect of the present invention, in which a plurality of fiber laser amplifiers are used to amplify the beam from a master oscillator laser, and the outputs of the fiber laser amplifiers are combined using a diffractive optical element. The laser apparatus, control systems, and associated methods described herein are depicted in the application environment of a laser system employing multiple fiber laser amplifiers and a diffractive optical element beam combiner, by way of example but not limitation, to show how challenges encountered in combining multiple beams may be overcome. However, one of skill in the art will appreciate that the control systems could also be advantageously applied to lasers using other beam combination technology, and more generally to other laser types, in environments not limited to fiber lasers, without modification or with modifications within the ken of a person of skill in the art, consistent with the spirit of the invention.

The present application relates to lasers and control systems therefor, which may be implemented using a variety of electronic and optical technologies, including but not limited to: analog electronic systems; digital electronic systems; microprocessors and other processing elements; and software and otherwise embodied collections of steps, instructions, and the like, for implementing methods, processes, or policies in conjunction with such systems and processing elements. It will be appreciated that in the laser and control system arts, various signal leads, busses, data paths, data structures, channels, buffers, message-passing interfaces, free-space optical paths, fiber optical paths, and other communications paths may be used to implement a facility, structure, or method for conveying information or signals, and are often functionally equivalent. Accordingly, unless otherwise noted, references to apparatus or data structures for conveying a signal or information are intended to refer generally to all functionally equivalent apparatus and data structures.

As best seen in FIG. 1, the laser system 100 preferably includes a master oscillator laser 110, a plurality of fiber amplifiers 122a-122e, a piston error control system 140, a converging lens 150, and a diffractive optical element 160, optically coupled in sequence, to produce a combined output beam 170. The laser system 100 may optionally include a tilt error control system 130. Alternatively, acceptable performance may be achieved in some applications by minimizing tilt error through careful alignment of the beamlets with respect to the DOE at the time of assembly or at the beginning of operation.

The master oscillator laser 110 may be any suitable laser adapted to provide an output beam which has a desired wavelength for the application and which is compatible with fiber amplifiers 120a-120e. Master oscillator laser 110 preferably is relatively stable and has a narrow bandwidth output spectrum within the amplification passband or gain bandwidth of the fiber amplifiers 120a-120e. By way of example but not limitation, master oscillator laser 110 may be a solid state Neodymium-doped Yttrium-Aluminum-Garnet (Nd:YAG) laser of conventional design operating at a wavelength of 1060 nm. Such lasers are available from commercial sources. Other types of laser may be used as master oscillator 110. The wavelength selected for master oscillator laser 110 and fiber amplifiers 120a-120e controls certain physical parameters of other portions of the laser system 100, as discussed further in greater detail. However, if those parameters are taken into account, the general structure of the laser system 100 described herein is suitable for use with a wide range of wavelengths, corresponding to a range including at least the far infrared through the ultraviolet.

The master oscillator laser 110 is coupled to fiber amplifiers 120a-120e via master oscillator distribution path 112, which may be any appropriate optical path, including free space optics. One or more beam-splitters (not shown) may be provided to divide the master oscillator output beam for use by the several fiber amplifiers. The effective optical path length of master oscillator distribution path 112 to each of the fiber amplifiers 120a-120e is preferably nearly identical (or at least the remainders after integral numbers of whole wavelengths are subtracted are preferably identical) to minimize the phase error of the signal supplied at the input of each amplifier.

Amplifiers 120a-120e are preferably any suitable optically-pumped fiber laser amplifiers, selected for compatibility with the output signal from the master oscillator laser 110, and for a desired power output. Amplifiers of this type are available from commercial sources. Amplifiers of this type are generally designed for a specific wavelength and have a gain bandwidth of a small fraction of a wavelength. By way of example, but not limitation, laser system 100 as described herein has five fiber amplifiers 120a-120e. The number of amplifiers required depends on several factors, including the output power desired and the design of the diffractive optical element (DOE) 160. The DOE 160 is generally designed to combine a specific, odd number of intermediate input beamlets arranged in a specific repetitive one- or two-dimensional pattern.

For a DOE having linear grooves, the input beamlets generally must be incident on the grating in a fan-like radial pattern within a plane normal to the major surface of the DOE and perpendicular to the grooves, wherein adjacent beamlets are radially displaced from one another by a consistent angular increment which is a function of the grating spatial frequency and the wavelength. In general, this means that the fiber amplifiers 120a-120e are arranged in a one-dimensional array. DOEs having a crossed groove pattern could also be used, possibly requiring a different arrangement of fiber amplifiers 120a-120e.

Each of fiber amplifiers 120a-120e produces a respective intermediate output beamlet 122a-122e, which may be any suitable optical path, including without limitation a free-space optical path. The output beamlets are subject to a several errors which, uncorrected, cause the production of secondary or "satellite" outlet beamlets from the DOE 160 or otherwise reduce the quality of the combined output beam 170. "Piston error" is, in essence, a phase displacement of an amplifier's intermediate output beamlet with respect to others. Piston error may arise from mechanical differences between amplifiers, including but not limited to variations in fiber length and other dimensional parameters, anomalies in fiber or coupler construction, and thermal differences. Although it is preferable to have zero piston error, in general, piston errors of less than a milliradian will provide acceptable performance of laser system 100. "Tilt error" is an error in angular alignment of an intermediate beamlet as it strikes the face of the DOE 160. "Tilt error" typically arises from imperfection in the orientation of an amplifier with respect to the DOE 160 or the converging lens 150. Although it is preferable to have zero tilt error, in general, tilt errors of less than one percent of the product of wavelength and the DOE spatial frequency will provide acceptable performance of the laser system 100.

In order to correct piston error, laser system 100 preferably includes a piston error control system 140 which modifies one or more of the fiber amplifier output intermediate beamlets 122 to minimize this type of error. A tilt error control system 130 may optionally be provided, which may also modify one or more of the fiber amplifier output intermediate beamlets 122. Although all beamlets may be so modified, it may reduce cost and system complexity to assign one beamlet as a "reference" beamlet, which will not be modified by the error control systems, and then modify the remaining beamlets to minimize error with respect to the assigned reference beamlet. As best seen in FIG. 1, the intermediate beamlet 122a from amplifier 120a, which is axially coincident with the combined output beam 170, the central axis of the DOE 160, and the central axis of converging lens 150, is selected as the reference beamlet. It is not required that the beamlet selected to be the unmodified reference beamlet for one of error control systems 130, 140 necessarily be assigned as the reference beamlet for the other. In further discussion, the reference character "a" is used to identify the reference beamlet and items associated therewith, and the reference characters "b-e" are used to identify the non-reference beamlets and items associated therewith. Because the piston error control system 130 generally operates only on the non-reference beamlets 122b-122e, there is usually no element corresponding to reference character "a".

The structure and operation of the piston error control system 140 are described further in greater detail. At this point, however, it is important to note that each of the fiber amplifier output intermediate-beamlets 122 other than that selected as the reference beamlet may be modified for error minimization purposes. AM modulators 132b-132e are preferably interposed in the paths of intermediate beamlets 122b-122e to impose a beam tagging signal needed by piston error control system 140 measure and distinguish the piston error associated with each intermediate beamlet. Phase modulators 142b-142e are preferably interposed in the paths of intermediate beamlets 122b-122e to allow piston error control system 140 to measure and distinguish the piston error associated with each intermediate beamlet, and to adjust the phase of each intermediate beamlet to minimize the piston error. AM modulators 132b-132d and phase modulators 142b-142d could instead be interposed in the signal paths 112 between the master oscillator and the fiber amplifiers, after the point where the master oscillator signal is divided into multiple paths for distribution to the fiber amplifiers, but it is believed that the best results are obtained by having these components in the paths between the amplifiers 122b-122e and the converging lens 150.

The converging lens 150 causes the fiber amplifier output intermediate beamlets 122b-122e to converge on a focal location on the face of DOE 160. Any suitable lens which is compatible with the wavelength of the amplifier output beams may be used. A typical lens has appropriate coatings to minimize internal reflection. The lens 150 may be constructed of glass or of other appropriate optical materials. The focal ratio of the lens may be approximately 1:3.5, but other lenses could also be used. The focal length of the lens, and its distance from the DOE 160, are selected to cause the fiber amplifier output intermediate beamlets 122a-122e to strike the DOE 160 at multiples of a characteristic incident angle (eigenangle) determined by parameters of the DOE and the wavelength. The design of such lens parameters is well known in the art.

Diffractive optical element (DOE) 160 combines the fiber amplifier output intermediate beamlets 122b-122e into a combined output beam 170. DOE 160 is a special type of grating having a grating surface shape (i.e., grooves) constructed according to a particularly designed grating function. A DOE differs from a conventional grating in that the DOE grating is coarser (i.e., the spatial frequency of the grooves of the DOE is much lower), and the shape of the grooves in the DOE surface is important. The product of grating line frequency (lines/cm) multiplied by the light wavelength (cm) defines a characteristic angle or 'eigenangle,' expressed in radians. Beamlets must be incident on the DOE at angles 152 equal to plus or minus the eigenangle (as measured from the grating normal), or in plus or minus simple integer multiples of the eigenangle in order that the beamlets be combined into a single output beam exiting from the opposite side of the DOE.

Figures 2, 3:
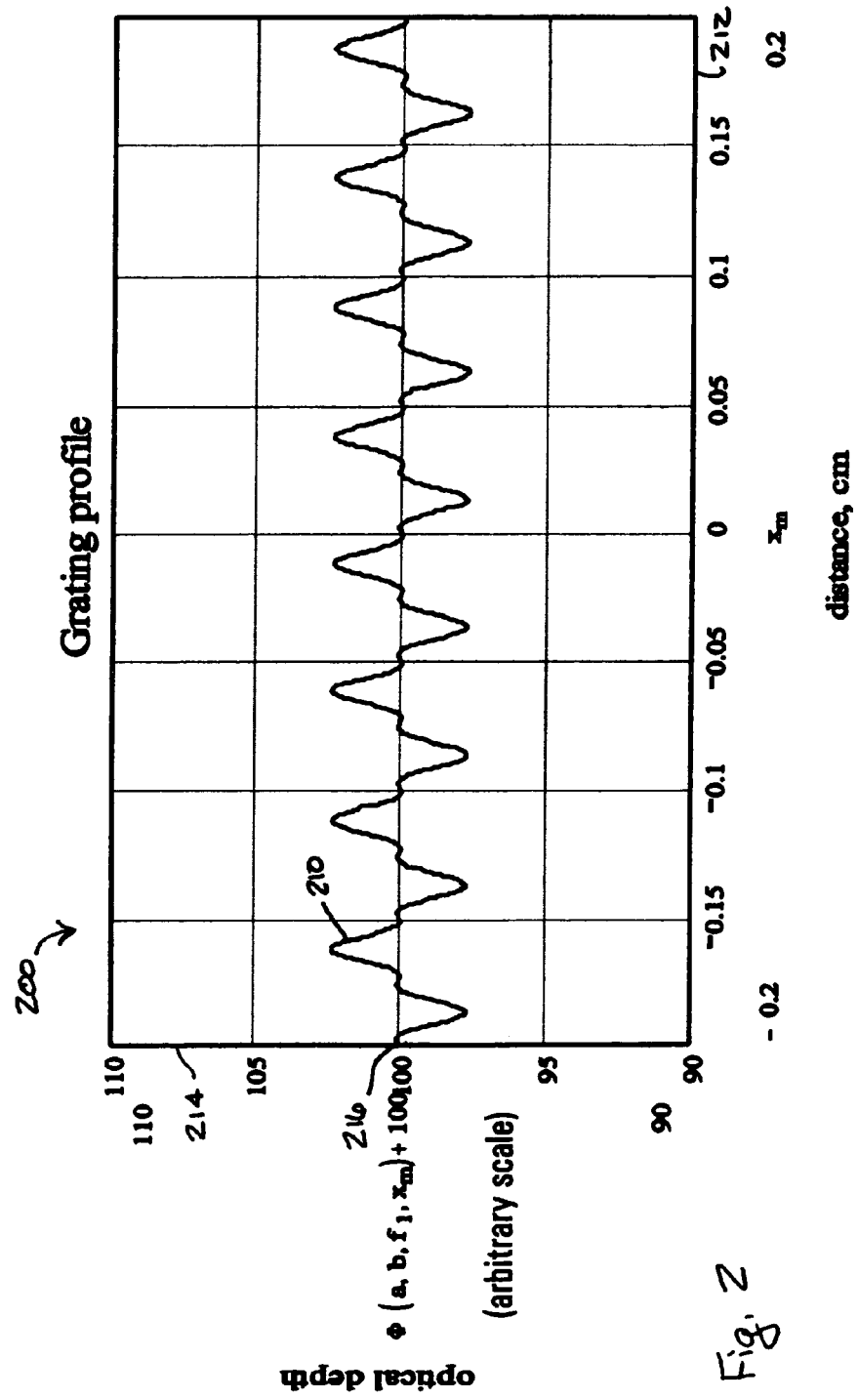
FIG. 2 is a graph 200 depicting a grating profile 210 for an example embodiment of a diffractive optical element (DOE) 150 which may be used in the laser system 100 of FIG. 1.
FIG. 3 depicts two equations which define physical characteristics of the DOE 150 of FIG. 1-2.

FIG. 2 is a graph 200 depicting a grating profile 210 for an example embodiment of a DOE 150 which may be used in laser system 100. The grating profile shown in FIG. 2 is, in essence, a cross section view through the DOE 150 along an axis perpendicular to the grooves of the DOE. The aforementioned perpendicular axis is represented as the abscissa or X-axis 212 of graph 200. The grating profile 216 is depicted as the surface boundary position or relative optical depth, proportional to the substrate index of refraction. The scale is chosen to reveal the groove profile, but is otherwise arbitrary, as measured by the ordinate or Y-axis 214.

FIG. 3 depicts two equations which define physical characteristics of the DOE. The grating profile 210 is defined by a grating profile function 312. Function 310 defines a grating transmission function. The far-field pattern of the DOE is equal to the Fourier transform of the sum of the incident electric fields, each one multiplied by the grating transmission function. As best seen in FIG. 2, the fundamental line spacing, or spatial frequency of the DOE is F0=20 lines per cm. This is very small compared to that of conventional gratings (typically 10000-70000 lines per cm.). The grating function 312 has a first term varying at a first frequency (F0), and a second term varying at a frequency F1=3F0 with coefficients indicating the ruling optical depth at the operating optical wavelength. The particular shape of the grating profile is important to the beam combining function; deviations will degrade or completely eliminate the ability of the DOE to combine the intermediate beamlets. The coefficients in the grating profile have been selected to minimize stray power in secondary exit lobes.

The separation interval 152 between adjacent eigenangles is defined by the product of the wavelength of the beams being combined and the spatial frequency of the DOE. For the example DOE 150 defined by DOE grating profile function 312, operating at a wavelength of 1060 nm, the interval between adjacent eigenangles is 2.128 mrad. Although the grating profile function 312 of FIG. 2-3 is suitable for a range of wavelengths, if significantly shorter wavelengths are used while holding the DOE spatial frequency constant will result in small eigenangle separation intervals, which may make it difficult or impossible to properly arrange the intermediate beamlets to strike the DOE 150 at the correct incident angles. Thus, it may be necessary to increase the spatial frequency of the grating to accommodate intermediate beamlets of shorter wavelengths. The design of suitable diffractive optical elements has been well described in technical literature, and suitable DOEs are available from commercial sources. It is believed that current technology allows the construction of DOEs having a desired grating profile shape with a spatial frequency as high as 10000 rules per cm, and therefore the spatial frequency of available DOEs is unlikely in practice to be a factor limiting the practical application of this beam combination apparatus for shorter wavelengths.

DOE 160 produces a combined output beam 170 that exits the opposite face of the DOE 160 from which the beamlets entered. The combined output beam 170 may contain artifacts of uncorrected tilt error and uncorrected piston error. Accordingly, a sample of the combined output beam 170 is obtained for use by piston error control system 140 as further described below.

In accord with a further aspect of the present invention, the piston error control system 140 includes a sampling beam splitter 146, a piston error detection and processing unit 144, a plurality of phase modulators 142b-142e, one interposed in each of the fiber amplifier output intermediate beamlets 122b-122e other than the selected reference beamlet 122a, and AM modulators 132b-132e also interposed in each of the non-reference fiber amplifier output intermediate beamlets 122b-122e.

In brief, the piston error detection and processing unit 144 receives the sample of combined output beam 170 from piston error sampling beam splitter 146 over path 172. The piston error detection and processing unit 144 supplies phase modulator control signals via bus 174 to the respective phase modulators 142b-142e. A separate phase modulator control signal is provided for each of phase modulators 142b-142e. Each of the phase modulator control signals 174 includes a piston error control component, unique to the respective phase modulator, and a dither component which is also unique to the respective modulator. The phase dither allows the direction of the phase error to be determined.

For each beamlet, the measured piston error is supplied to a respective cascaded pair of product detectors followed by an integrator; the integrator value is used to produce a proportional signal to control a respective one of phase modulators 142b-142e to adjust the phase and thereby correct the piston error. Thus, piston error control system 140 forms a first order or Type I servo loop for each non-reference beamlet which drives to zero the piston error contributed by that beamlet. The terms "first order" and "Type I" refer to a set of servo loop properties well known to persons of skill in the art of control systems. The servo loops referred to herein have the "first order" and "Type I" properties, and these terms are used interchangeably herein.

Any suitable optical phase modulator may be used to implement phase modulators 142b-142e. By way of example but not limitation, each of phase modulators 142b-142e may be implemented using a Pockel's Cell phase modulator. The phase modulator receives an electrical signal; internally, the phase modulator has a refractive index that varies with an applied electric field. The phase modulator thus provides a variable phase delay which can be used to correct piston error. The magnitude of dither phase modulation is preferably limited to a small value, such as a few degrees of phase, in order to limit degradation of the far-field beam quality. Although processing circuits and phase modulators suitable for correcting piston errors associated with four beamlets 122b-122d are described and shown herein, any number of processing circuits and phase modulators could be used as needed to accommodate the number of beamlets to be corrected (excluding the designated reference beamlet.

The piston error detection and processing unit 144 also provides for each non-reference beamlet a unique respective beam tagging control signal via path 178 to a corresponding one of AM modulators 132. The control signals cause the AM modulators to modulate each of the non-reference beamlets 122b-122e with an appropriate unique tagging or identification signal, such that piston error associated with such beamlet can be measured by piston error detection and processing unit 144 and distinguished from the piston error associated with all other beamlets. The generation of the unique tagging or identification signal is described further in greater detail (see FIGS. 8-9 and the description thereof). AM modulators 132b-132e may be implemented using any suitable modulator technology, including but not limited to a Mach-Zehnder interferometer. Such interferometers are available from commercial sources.

Figure 4:
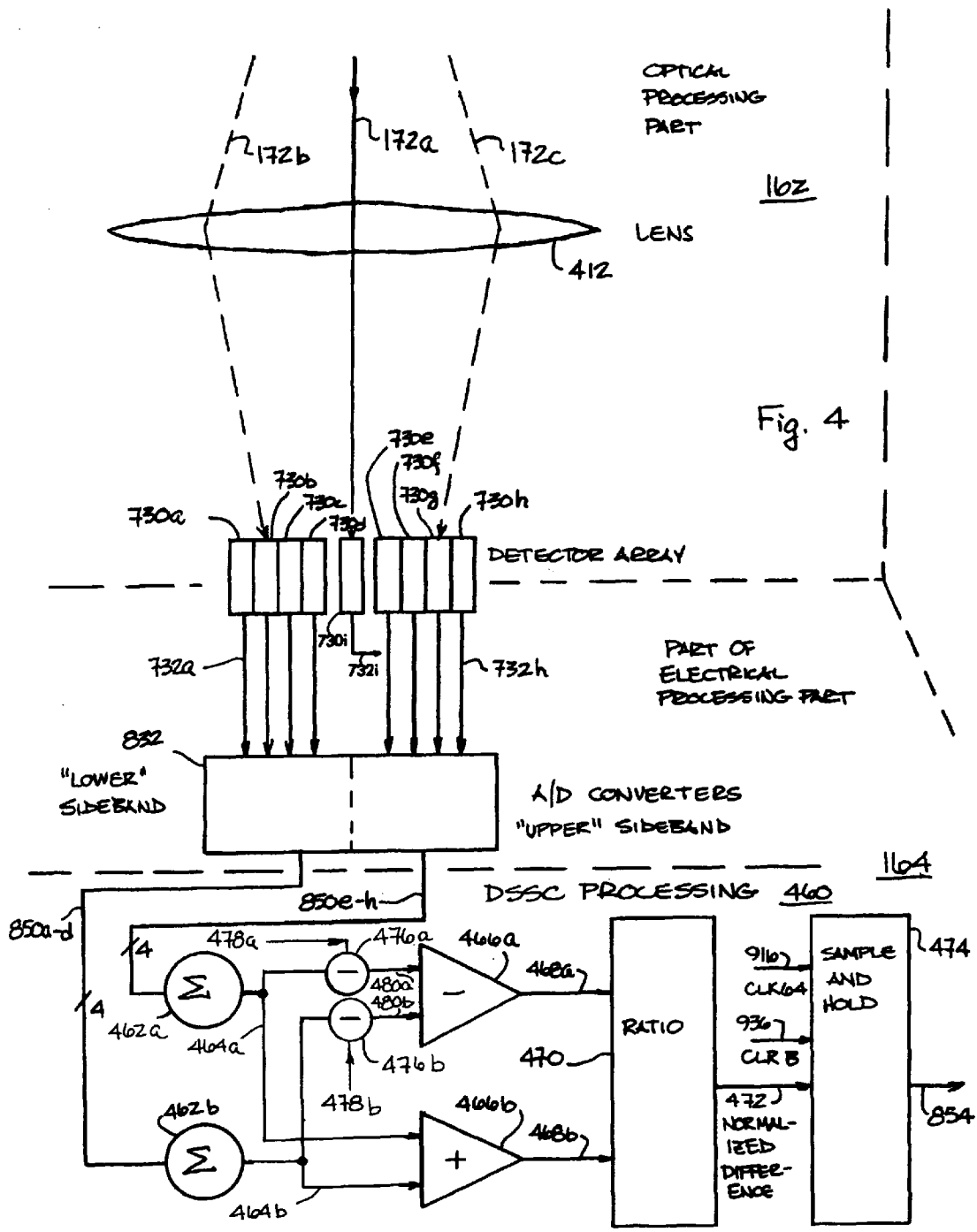
FIG. 4 is a block diagram of a first portion of an example piston error detection and processing unit 144 for use in conjunction with the laser system 100 of FIG. 1.
Figure 5:
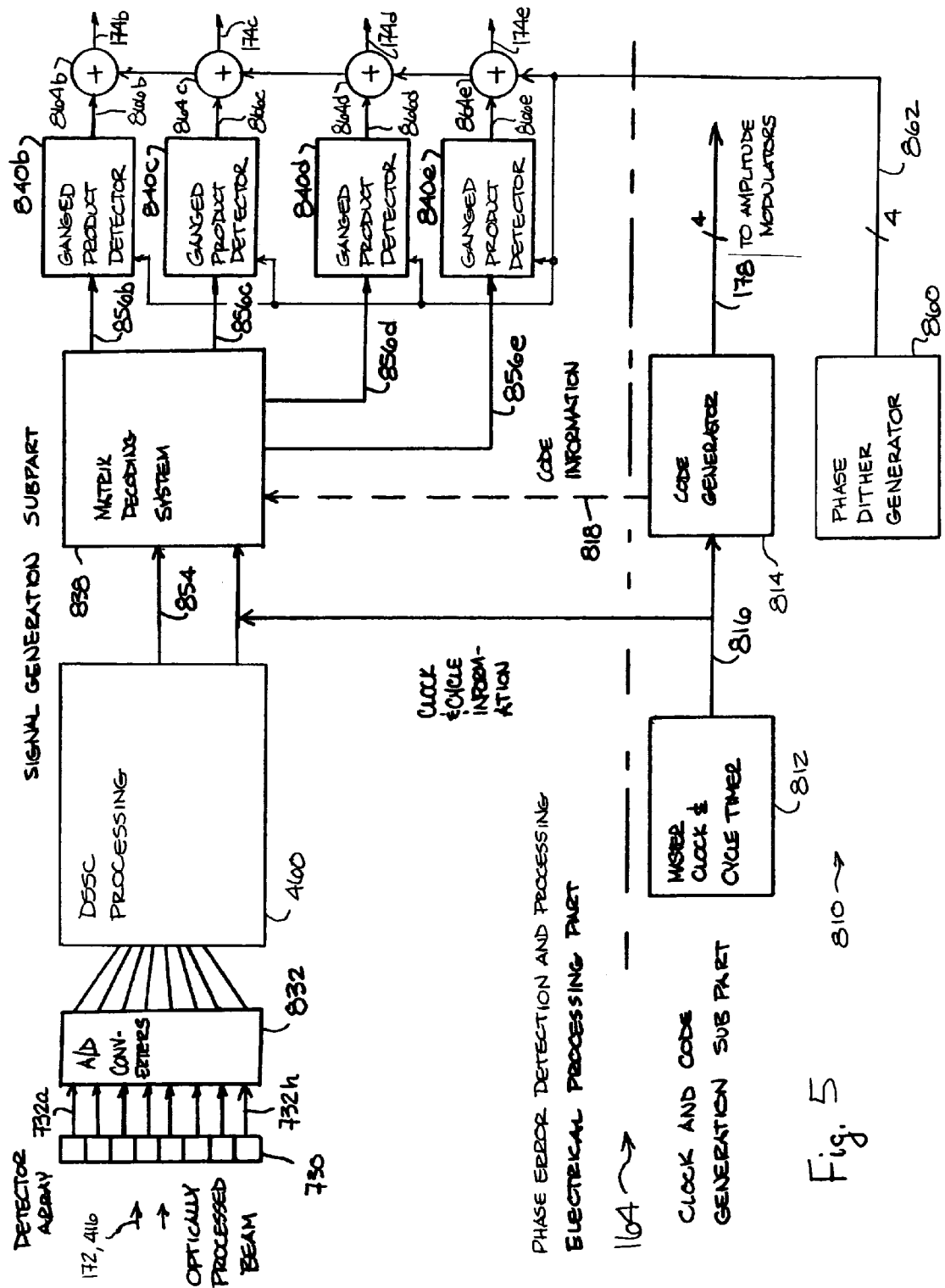
FIG. 5 is a block diagram of a second portion of an example piston error detection and processing unit 144 for use in conjunction with the laser system 100 of FIG. 1.

FIGS. 4 and 5 in partially-overlapping combination form a block diagram of the piston error detection and processing unit 144. FIG. 4 depicts the optical processing part 162 and a portion of the electrical processing part 164 of unit 144. The elements of FIG. 4 generally encompass the acquisition and initial processing of a signal representing the combined piston error contributions of all beamlets. FIG. 5 depicts the electrical processing part 164, including elements which decode and distinguish the piston errors contributed by each of the beamlets and produce piston error correction signals used to control the phase modulators 142.

As best seen in FIGS. 1 and 4, the optical processing part 162 of piston error detection and processing unit 144 receives a piston error sample beam 172. Piston error sample beam 172 is a sample of combined output beam 170 provided by piston error sampling beam splitter 146 (FIG. 1). Any suitable beam splitter may be used as beam splitter 146, including without limitation a partially silvered mirror. Only a small fraction of the combined output beam 170 need be collected as a sample. Components of the sample beam 172 include a sample 172a of the primary output beam or central lobe, and samples 172b and 172c of some secondary or satellite beam components which result from piston error. Although secondary or satellite beam components could also result from tilt error, for the purpose of this description, it is assumed that tilt error has been corrected, so that any uncorrected tilt error artifacts are insignificant. The satellite or secondary beam components 172b and 172c, to the extent present, appear as optical upper and lower sidebands on either side of the central lobe or primary output beam 172a. Although the secondary or satellite beam components are schematically represented by lines 172b and 172c, several secondary beamlets may emerge from the DOE at any of the eigenangles defined by the DOE geometry and the wavelength of light being used, and those several secondary beamlet components would be represented in the sample beam 172.

Optical processing part 162 preferably includes a lens 412 for converging any secondary beam components or sidebands to impinge on an array of optical detectors 730. The lens 412 may be constructed as a standard single element lens using a material that has minimal attenuation at, and is otherwise compatible with, the wavelength in use. In the example system employing a 1060 nm wavelength, an OH-free glass, such as the commercially-available SUPRASIL 300 may be used. The mention of this material merely an example; other materials may be suitable at 1060 nm, and it may be necessary to select a different material at other wavelengths. Lens 412 is preferably AR-coated. Because it must image a line onto a linear detector array, it is useful to avoid spherical aberration. Consequently the lens F-number is preferably 3.5 or greater. The detector array 730 may be at least conceptually, and in some embodiments physically, divided on either side of the axis of the primary beam 172a into segments corresponding to the "lower" and "upper" sidebands or secondary beamlets 172b and 172c respectively. Lower-sideband sample beam 172b impinges on the face of the lower-sideband segment of the detector, and the upper-sideband sample beam 172c impinges on the face of the upper-sideband segment of the detector. The detector may generally be considered to be a square-law device for measuring the intensity or power of the beam on particular areas or locations of the detector. Advantageously, the optical processing part 162 of the piston error detection and processing unit 144 does not employ an interferometer or similar structure, and may be considered "interferometer-free".

Figure 7:
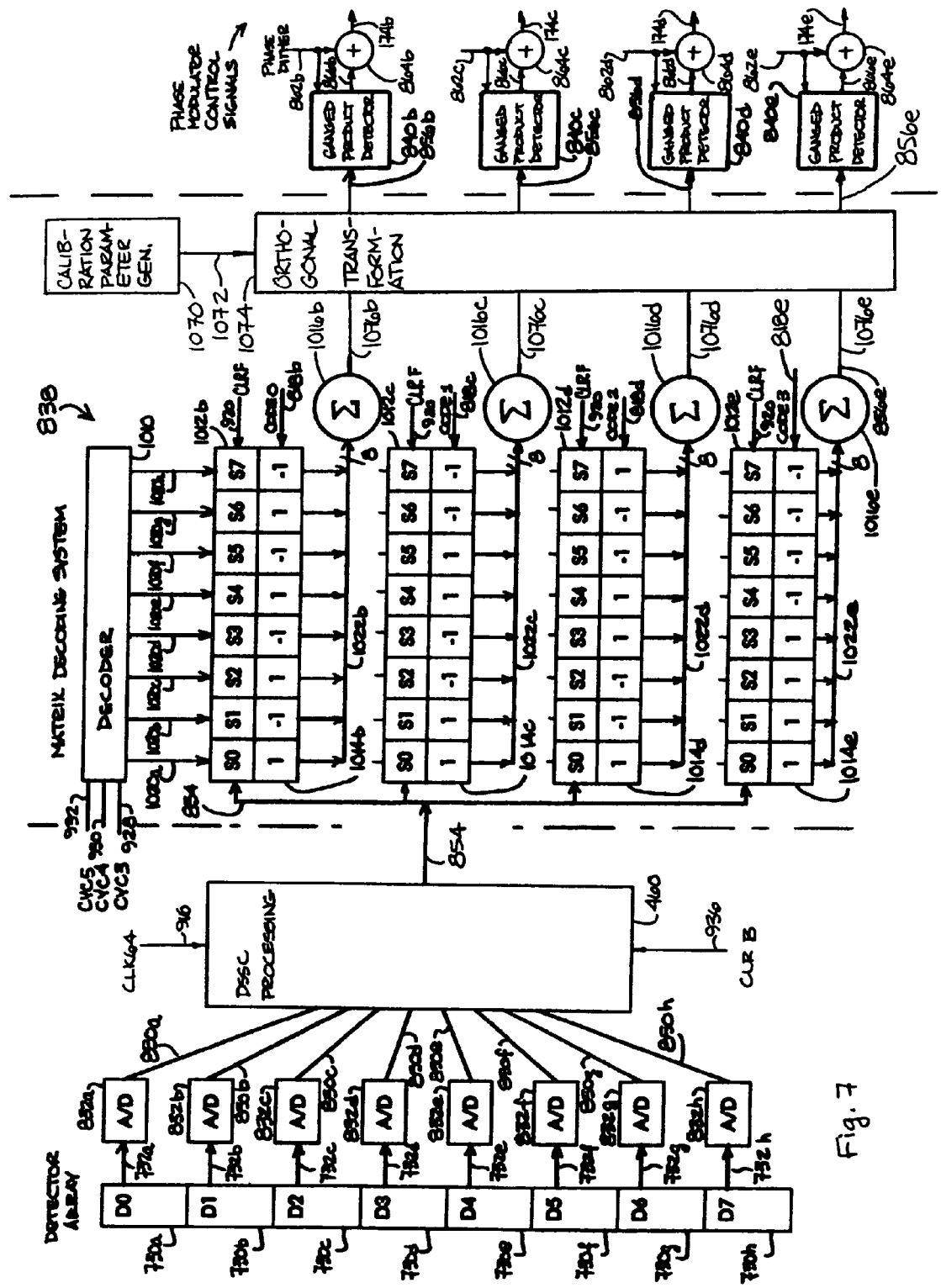
FIG. 7 is a block diagram showing a coding and correction signal generation subpart 830 of an electrical processing part 164 of FIGS. 1, 4, and 5, for use with the piston error control system 140 of laser system 100 of FIG. 1.

The detector array 730 may be any suitable array of detector elements employing any appropriate detector technology. For example, the detector array 730 may employ a plurality of detector elements 730a-730h (see FIGS. 4, 5, and 7) arranged in a linear pattern, aligned in a plane that contains the central order and any secondary beamlets that exist by virtue of misalignment or piston error. The appropriate inter-element spacing of detector elements 730a-730h for a particular embodiment varies depending on the length of the optical path between the DOE and the detector array. The inter-element spacing is determined by the expected spread of satellite beamlets and the distance from the DOE. Assume that any lenses following the DOE form a telescope with unity magnification. For a beamlet separation of 2.128 milliradians, satellite beamlets will be spaced by about 106 microns if the detector plane is 5 cm from the DOE. Hence the detector pitch (element spacing) is about 100 microns. By way of example but not limitation, the detector elements 730a-730h may be implemented using photocells, photodiodes, phototransistors, photovoltaic devices, CCD or CMOS image sensors, or other appropriate detector devices that can produce an electrical signal representative of the intensity of light incident on the elements. In a laboratory embodiment of a piston error detection and processing unit 140 for use with a 1060 nm laser system, an array of silicon-PIN-diode type detector elements was successfully employed. If a laser system 100 producing output at a wavelength substantially different from this 1060 nm example is to be constructed, it may be necessary to select a different detector type which is more appropriate for the wavelength in use. For example, in the intermediate infrared wavelengths, mercury-cadmium-telluride or indium-antimonide diode arrays could be used. The arrangement of system 100, in which the detector array is operated in a current measurement mode (as opposed to, e.g., a single-photon counting mode), is such that dark current is not considered a major problem, and special cooling of the detector array is not required. As a result, a variety of detector technologies may be suitable. One of skill in the art will appreciate how to select a detector technology appropriate for the wavelength in use. Although eight or nine detector elements are shown in FIGS. 4, 5, and 7, the specific number of detector elements used is non-critical. The number of detector elements used may be selected depending on the commercial availability of suitable detector arrays and on the convenience and expense of a like number of downstream elements, such as analog-to-digital converters, for the processing of the detector output signals. Although the detector 730 is referred to as an "array", any suitable structure could be used, including a monolithic detector device, provided that measurements of secondary beamlet components associated with one sideband are distinguishable from measurements of secondary beamlet components associated with the other sideband.

As best seen in FIG. 4, the detector array 730 may be divided into a first portion, e.g., 730a-730d, for detecting lower-sideband secondary beamlet components, and a second portion, e.g., 730e-730h. Optionally, a central detector element 730i (shown only in FIG. 4) may be used to measure the power or intensity of the central lobe, in order to assess directly the effectiveness of the control system, as is known in the art. The central lobe output is maximized when the sidebands are suppressed to a maximum extent. Although the lower sideband portion 730a-730d and upper sideband portion 730e-730h are depicted as displaced from one another, the drawing is not to scale, the actual separation may be more or less than that shown, and in some applications no separation is necessary. In a commercial embodiment, even if a separation is required, it may be most cost effective to use a single large array. The signal 732i from any centrally located detector elements may be ignored, or optionally may be processed separately as a central lobe signal for use in measuring effectiveness of the control system as described above. The detector array 730 furnishes output signals via a detector output signal bus 732, discussed further in greater detail.

Piston error results in satellite beamlets, which appear as optical sidebands on either side of the central lobe. A lack of balance indicates piston error in one or more of the fiber amplifier output intermediate beamlets 122 incident on the DOE 160.

In order to correct the piston errors contributed by the individual beamlets, it is necessary to distinguish and measure their individual piston errors and to produce appropriate correction signals. Because each of non-reference beamlets 122b-122e is tagged or encoded with a unique digital signal, an appropriate decoder respectively associated with each non-reference beamlet can be used to distinguish the magnitude and direction of piston error artifact contributed by such beamlet from that contributed by all other beamlets, effectively producing a measure of piston error for each beamlet. These functions are performed by piston error electrical processing part 164.

FIG. 5 is a simplified block diagram of the electrical processing part 136b. The electrical processing part 136b may be subdivided into a clock and code generation subpart 810, which is shown in greater detail in FIG. 6, and a coding and correction signal generation subpart 830, which is shown in greater detail in FIG. 7. An example embodiment of a Double Sideband Suppressed Carrier (DSSC) signal processing system 460 is shown in FIG. 4, and is described in greater detail when that element is encountered in the description of FIG. 5.

As best seen in FIG. 5, clock and code generation subpart 810 preferably comprises a master clock and cycle timer 812 and a code generator 814.

The master clock and cycle timer 812 provides on bus 816 a set of clock and cycle information signals which are used to control the timing of the remaining elements of electrical processing part 164. Responsive to clock and cycle information from master clock and cycle timer 812, code generator 814 produces code information for use in impressing on each of the non-reference beamlets 122b-122e a respective tagging or identification signal. The tagging or identification signal enables the piston error contributed by each non-reference beamlet in the combined output beam 170 to be distinguished from the other beamlets. Code generator 814 produces control signals containing the code information on a bus 178 which is supplied to the AM modulators 132b-132e. Code generator 814 also provides code information on a bus 818 for use by coding and correction signal generation subpart 830 in detecting the tagging or identification signals. The code generator 814 is described further in greater detail (see FIG. 6 and the description thereof).

In addition to generating beamlet tagging code, the clock and code generation subpart 810 also comprises a phase dither generator 860 which provides a phase dither signal on bus 862. For each of the non-reference beamlets 122b-122e, the phase dither signal 862b-862e is summed with the respective piston error correction estimate 866b-866e to produce a corresponding phase error modulator control signal 174b-174e which is supplied to the corresponding phase modulators 142b-142e. The phase dither signal allows the direction or sign of piston error to be recovered. Only a very small amount of phase dither is needed. For example, the phase dither may be in the range of 30 to 70 mrad. Phase dither in this amount is believed to be sufficient to allow recovery of the sign of the piston error, without significantly degrading the far-field beam quality. The phase dither signal is also supplied to the cascaded product detector units 840b-840e, which are described further in greater detail. All of the phase dither signals must exhibit the same frequency.

As best seen in FIG. 5, coding and correction signal generation subpart 830 comprises a set 832 of analog-to-digital (A/D) converters, a DSSC signal processor 460, a matrix decoding system 838, cascaded product detectors 840b-e, and summers 864b-864d. The A/D converters 832 receive output signals 732a-732h from the elements of the detector array 730. Any suitable A/D converters may be used. A/D converters 832 may be are described herein in plural terms and a separate A/D converter may be provided for each of the detectors in the detector array. Alternatively, a single higher-performance A/D converter could be multiplexed to serve all of the detectors. The data rate for the A/D converters will depend on (a) the number of channels; (b) the desired maximum servoloop bandwidth; (c) the size (i.e., width in bits) of the code words used to distinguishably encode each beamlet; (d) any per-bit oversampling used in acquiring the beamlet error signals; and (e) whether plural, detector-associated A/D converters are used in parallel or a single A/D converter is multiplexed to serve all of the detectors. The bandwidths of the expected piston error disturbances are in the audio range-up to several KHz. Accordingly, the digital frame rate should be a factor of 5 or 10 larger than desired bandwidth. In order to discriminate between the non-reference beamlets using Hadamard code words, the number of non-reference beamlets determines the minimum length of the code words used to encode the beamlets as follows: if the number of non-reference beamlets is a power of two, the minimum length is that same number of elements or bits; if the number of non-reference beamlets is not a power of two, the minimum length in elements or bits is the next larger power of two. However the length of the Hadamard code words need not be limited to this minimum length. For example four beamlets can be encoded by code words with eight elements for better discrimination.

As an example of determining the needed A/D converter bandwidth, assume that the desired servoloop bandwidth is 2 KHz. The resulting frame rate must be at minimum 5 times this number, or 10 KHz. Each code word has 8 code bits. Therefore the code bit rate is 80 KHz. If it is desired to oversample each bit 8 times, then the required A/D bandwidth is the product of this number times 80 KHz or 640 KHz. Current commercially available A/D converters are capable of operation at sampling rates exceeding 1 GSPS. The number of controlled beamlets could increase by a factor of at least 1000 (e.g., to 4000) before currently-available commercial A/D converters would become the limiting factor in the operation of the piston error control system 140. By way of example, but not limitation, a commercially available A/D converter that could be used to implement A/D converters 832 is available from Analog Devices of Norwood, Mass. as type AD 9480; this is an 8-bit A/D converter that can operate at a conversion rate up to 250 MSPS.

The A/D converters 832 provide A/D converter output signals 850a-850g to DSSC processor 460, which produces a signal representing the normalized difference of the sideband energy measured by the detectors. As best seen in FIG. 4, the DSSC processor 460 receives signals from the A/D converters representing the detectors assigned to detect lower sideband energy on a bus 850a-850d, and supplies it to a summer 462b. The summer effectively averages the detected lower-sideband secondary or satellite beamlet components over the linear dimension of the lower-sideband portion of the detector array. Although the multiple detector elements collect information regarding the spatial variation of the interfered beam produced by optical processing part 136a, it is sufficient for piston error detection purposes to measure the total intensity of the lower-sideband components (less the carrier) on the detector. The lower-sideband summer 462b provides an output 464b to a comparator 466b and, via a summing junction 476b (described further in greater detail) and its output 480b, to a comparator 466a.

Similarly, the DSSC processor 460 receives signals from the A/D converters representing the detectors assigned to detect upper-sideband energy on a bus 850e-850h, and supplies it to a summer 462a. The summer effectively averages the detected upper-sideband secondary or satellite beamlet components. The upper-sideband summer 462a provides an output 464a to the comparator 466b, and, via a summing junction 476a (described further in greater detail) and its output 480b, to comparator 466a.

Comparator 466a finds the difference of the upper and lower sideband signals and provides it to a ratio detector 470 via path 468a. Comparator 466b finds the sum of the upper and lower sideband signals and provides it to a ratio detector 470 via path 468b. The ratio detector 470 provides a signal 472 representing the normalized difference of the energy in the upper and lower sidebands to a sample and hold device accumulator 474. Because the detector array 730 and subsequent processing circuits are necessarily imperfect, one portion of the detector array may exhibit a bias error with respect to the other portion. Summing junctions 476a and 476b may be employed to correct this bias error by subtracting corresponding bias signals 478a and 478b. Because comparator 466a finds a difference between the upper and lower sideband signals, and the result therefrom is used to determine a ratio of the sum and difference of these signals, the DSSC processing circuit is highly sensitive to bias error in the input to difference comparator 466a, but is not very sensitive to bias error in the input to sum comparator 466b. Thus, the bias correction summers are shown only in the branch of signals 464a and 464b leading to difference comparator 466a. However, the bias correction could be supplied to both comparators 466a and 466b. Also, since comparator 466a is linear, a bias correction need be applied to only one of its inputs. The bias signals 478a and 478b may be calibrated by measuring the detector outputs when the system 100 is adjusted to zero piston error. A method for use with the system 100 in calibrating the bias signals is described in connection with FIG. 10.

The DSSC sample and hold accumulator 474 receives the normalized sideband difference signal from the ration detector 470 and supplies that information at appropriate times to the matrix decoding system 838. Due to detector noise and other factors causing the normalized sideband difference signal vary over time, it is desirable to use a plurality of samples collected at different times for use in measuring piston error. Accordingly, DSSC sample and hold accumulator 474 may accumulate a group of samples, such as eight, before releasing the sample information to the matrix decoding system 838, as directed by timing control signals of bus 816 from master clock and cycle timer 812. The accumulating function effectively averages the samples within the group, although it is not necessary that the accumulated sample be normalized by dividing it by the number of samples provided that the number of samples accumulated in each group is consistent. The accumulated sample value is provided to the matrix decoding system 838 via lead 854. This value includes a plurality of time-displaced samples from detector array, as previously processed by elements of the DSSC processing unit 460.

Matrix decoding system 838 periodically receives accumulated sample values from DSSC sample and hold accumulator 474. Matrix decoding system 838 uses this information to decode therefrom signals representative of the piston error contributed by each of the non-reference beamlets 122b-122e. Each of the decoded piston error contribution signals 856b-856e, along with a corresponding phase dither signal 862b-862e, are furnished to a respective one of cascaded product detector units 840b-840e to produce a corresponding piston error correction estimate 866b-866e. The piston error correction estimate 866b-866e, and the phase dither signals 862b-862d, are supplied to respective summers 864b-864e, to produce corresponding phase modulator control signals, which are furnished to phase modulators 142b-142e via bus 174. The function of the cascaded product detector units 840b-840e is described further in greater detail (see FIG. 8).

Although A/D converters 832, DSSC processing unit 460 (and its components), matrix decoding system 838, cascaded product detector units 840, and summers 864 are depicted as separate devices, any one or more of them could be implemented as part of a computer-based control system, and any one or more of them could be integrated in various combinations, as is known in the art.

Figure 6:
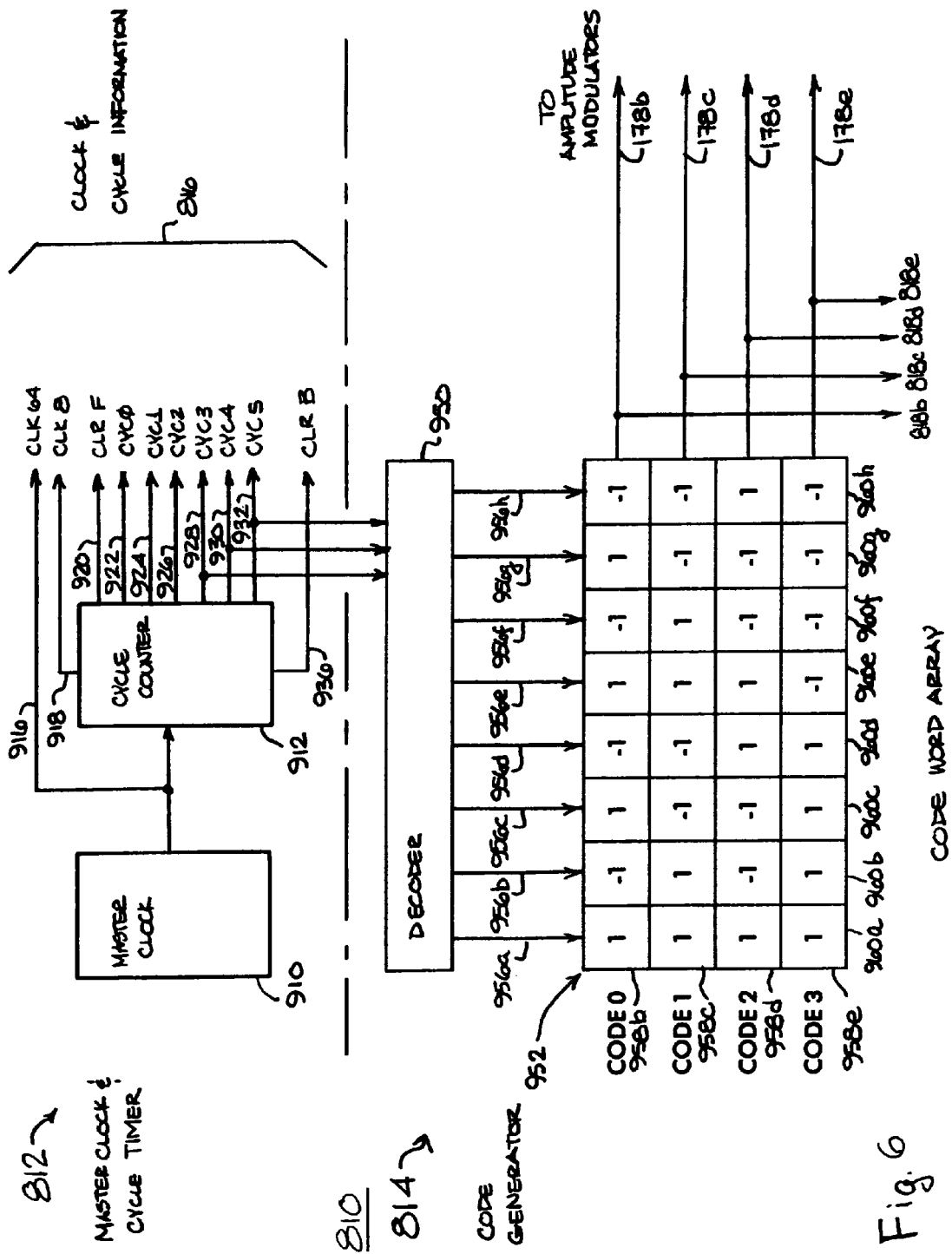
FIG. 6 is a block diagram depicting in greater detail a clock and code generation subpart 810 of the electrical processing part 164 of piston error detection and processing unit 144 of FIGS. 1, 4 and 5, for use with the piston error control system 140 of laser system 100 of the present invention.

FIG. 6 depicts elements of the clock and code generation subpart 810 in greater detail. The master clock and cycle timer 812 preferably comprises a master clock signal generator 910 and a cycle counter 912. The master clock signal generator 910 is a clock oscillator that defines the timing of the rest of electrical processing part 136b. As discussed further in greater detail, individual 8-bit repeating code words are used to modulate each of the non-reference beamlets 122b-122e. Each bit or element of the code is sequentially selected and transmitted (i.e., used for modulation of the non-reference beamlets) for 8 sample periods, to allow a plurality of samples to be collected and accumulated to minimize sampling noise and other unintentional variation over time. Accordingly, the master clock signal generator 910 produces a minor clock signal CLK64 on lead 916, each cycle of which defines a sampling period. Eight sample periods define the length of a bit of the code. 64 sampling periods and 64 cycles of the CLK64 signal, starting with the first bit and ending with the eight bit, define a "frame" or the period required to transmit a complete code word.

The cycle counter 912 receives the minor clock signal CLK64 916 and produces a number of derivative signals. A six-bit counter within cycle counter 912 produces a six-bit binary value representing a cycle number within a frame. The cycle number is presented as six cycle-count bit signals, starting with least-significant bit CYC0 922, and increasing in significance through CYC1 924, CYC2 926, CYC3 928, and CYC4 930, to the most-significant bit CYC5 932. The three most-significant bits CYC3 928, CYC4 930, and CYC5 932 identify the current code word bit number. A CLK8 signal 918 is asserted every eight minor cycles and identifies when the accumulated samples for the current code-word bit should be shifted into the matrix decoding system 838. A CLRB signal 936 is also asserted every eight minor cycles and identifies when the sample corresponding to the current code-word bit should be cleared from DSSC sample and hold accumulator 474. A CLRF signal 920 is asserted every 64 minor cycles, at the beginning of each frame, and identifies when each sample word should be cleared from registers in the matrix decoding system 838. Signals CLK64 916, CLK8 918, CLRF 920, CYC0 922, CYC1 924, CYC2 926, CYC3 928, CYC4 930, CYC5 932, and CLRB 936 form the clock and cycle information bus 816.

Code generator 814 generates an appropriate code which may be used to modulate each of the non-reference beamlets 122b-122e such that the piston error contribution from each beamlet may be measured in a way that distinguishes that contribution from those of all other beamlets. The tagging or identification signal may, for example, be produced by associating with each beamlet one or more unique code words or vectors from a Hadamard dictionary, replacing code vector elements of value 0 with the value −1, and selecting in turn individual elements of such code vector to control the modulator on a periodic basis. Hadamard codes are easy to generate in groups with a number of members that is a power of 2. Because the reference beam is not tagged or identified, the number of beamlets must be odd.

Normally, Hadamard code sequences employ ones and zeros. As is known in the art, a Hadamard code vector is orthogonal to all other non-identical Hadamard code vectors, in the sense that when two non-identical Hadamard code vectors are compared, the sums of bits that are the same, minus the sum of bits that are different, normalized by the number of bits, is zero. The Hadamard code words can be modified to replace code word elements of value 0 with the value −1. For example, the following four code words: Code0=(1, −1, 1, −1, 1, −1, 1, −1); Code1=(1, 1, −1, −1, 1, 1, −1, −1); Code2=(1, −1, −1, 1, 1, −1, −1, 1); and Code3=(1, 1, 1, 1, −1, −1, −1, −1) could be used to encode non-reference beamlets 122b-122e respectively. By modifying the Hadamard code words to replace code vector elements of value 0 with the value −1, and normalizing the vector to unit length, the sum of the elements in a Hadamard code vector is zero, and any two such vectors are orthonormal. These properties allow a signal encoded with a Hadamard code vector to be distinguishably decoded in the presence of other such signals.

Code generator 814 comprises a decoder 950 and a code word array 952. The decoder 950 is a 3-line to 8-line decoder which receives the three most-significant cycle-count bits CYC3 928, CYC4 930, CYC5 932 and asserts one of eight decoded bit-select signals 956a-956h corresponding to the current code word bit number identified thereby. The code word array 952 stores a copy of each of the 8-bit code words Code0 through Code3 in rows 958b through 958e of the array, respectively, corresponding to non-reference beamlets 122b-122e. Each of columns 960a-960h corresponds to one of the code word bits enabled by the bit-select signals 956a-956h.

For each of the code words 958b-958e in the array, the array provides a corresponding output signal 818b-818e which contains the value of the selected bit of such code word. For example, code word 0 output signal 818b contains the value of the bit of Code0 which is currently selected by decoder 950. As the cycle counter 912 advances through bit numbers 0-7, each bit of Code0 is output in turn on code word 0 output signal 818b. The array behaves similarly with respect to code words Code1-Code3 958c-958e, supplying output signals 818c-818e. The output signals from code generator 814 and code word array 952 thereof are also supplied to the AM modulators 132b-132e as AM modulator control signals 178b-178e respectively.

The phase dither generator 860 (shown only in FIG. 5) produces in conjunction with summing junctions 864b, 864c, 864d, and 864e, a unique phase dither signal for each of the non-reference beamlets 122b-122e. These signals are at a common frequency, supplied by the phase dither generator, 860, but each has a unique phase shift applied through the summing junction that just compensates the phase error in the respective controlled beamlet. The phase dither generator may create either a sine or a square wave—either will work—but must have low phase noise or 'jitter'. Specifically the RMS phase jitter is preferably less than 1%. If $d\phi/dt$ is the random generator phase excursion per unit time, then it is preferable that $(1/\omega)|d\phi/dt|<0.01$. Additionally, it should have a frequency in the range of 8 to 12 times the system sampling frequency. Circuits and algorithms for producing a phase dither signal are known in the art.

FIG. 7 is a block diagram depicting coding and correction signal generation subpart 830, and in particular, matrix decoding system 838, in greater detail. As described earlier in connection with FIGS. 4 and 5, detector elements 730a-730h provide detector output signals 732a-732h to A/D converters 832a-832h. The A/D converters 832a-832h provide A/D converter output signals 850a-850g to DSSC processing unit 460. Summers 466a and 466b in the DSSC processing unit 460 total the A/D converter output signals from the upper and lower sideband portions of the detector array, effectively averaging the detected interfered beam over the linear dimension of these portions of the detector array. The averaged sideband energy is compared by comparators 466a and 466b and provided to a ratio detector 470, which determines a normalized sideband difference signal 472 that is provided to DSSC sample and hold accumulator 474. DSSC sample and hold accumulator 474 receives clock signal CLK64 916, and accepts and accumulates a sample from ratio determination unit 470 once each minor cycle (eight times per code word bit period). The accumulator output signal 854 containing the accumulated sample value is furnished to matrix decoding system 838. DSSC sample and hold accumulator 474 also receives bit clear signal CLR-B 936, which is active briefly at the end of each code word bit period, and which instructs the accumulator to clear its contents to enable it to accumulate samples corresponding to the next code word bit.

The matrix decoding system 838 comprises a decoder 1010, a group of four piston error decode matrices, each assigned to decode the piston error contributions from one of the non-reference beamlets 122b-122e, and a transformation unit 1074 and calibration parameter generator 1070 used to correct certain crosstalk errors. The decoder 1010 is a 3-line to 8-line decoder which receives the three most-significant cycle-count bits CYC3 928, CYC4 930, CYC5 932 and asserts one of eight decoded bit-select signals 1020a-1020h corresponding to the current code word bit number identified thereby.

Each of the piston error decode matrices comprises a sample register denoted 1012b-1012e, respectively, a code word register/multiplier denoted 1014b-1014e, respectively and a summer denoted 1016b-1016e.

Each of the sample registers 1012b-1012e is eight positions wide. Each of these eight positions is capable of receiving and storing the accumulated detector sample value corresponding to one code-word bit period as furnished by DSSC sample and hold accumulator 474. The bit select signals 1020a-1020e from decoder 1010 are provided to each of the sample registers 1012b-1012e. As the cycle counter advances through each code word bit and an accumulated sample value for that bit becomes available from DSSC sample and hold accumulator 474, the decoder 1010 asserts the corresponding one of the bit-select signals 1020a-1020h, and that value is stored in the corresponding bit position of sample registers 1012b-1012e.

Although each bit position corresponds to a code-word bit period, the value stored therein is not a binary value. Instead, this value represents all of the samples collected from the several detector elements during the sampling intervals occurring in one bit period. Thus, in the embodiment described herein, the value would represent eight detector elements, sampled eight times per bit period, for a total of 64 samples. The value may be stored in the form of an integer, a fixed point number, or a floating point number, or an analog (continuous-valued) quantity, depending on the particular types of detectors, post-detector signal processing, and the storage provided in the sample registers 1012b-1012e.

Each of the code word registers/multipliers 1014b-1014e is also 8 positions wide. Each of these eight positions is capable of receiving and storing one code word bit value provided by the code word array 814 (FIGS. 8-9) via code word output signals 818b-818e. The bit select signals 1020a-1020e from decoder 1010 are provided to each of the codeword registers 1014b-1014e. As the cycle counter advances through each code word bit interval, and a set of code word bits becomes available from the code generator 814, the decoder 1010 asserts the corresponding one of the bit-select signals 1020a-1020h, and that value is stored in the corresponding bit position of codeword registers/multipliers 1014b-1014e. Each value may be a 1 or a −1. Thus, once the eighth codeword bit becomes available, each of the codeword registers/multipliers 1014b-1014e contains a corresponding complete codeword identical to that stored in code word array 952 and used to modulate a corresponding one of the non-reference beamlets 122b-122e. Although the code word bits are described herein as being individually received from code generator 814 and "clocked" into each of the codeword registers/multipliers 1014b-1014e, other implementations could be used. For example, each of the codeword registers/multipliers 1014b-1014e could contain a permanent copy of the corresponding code word row 958b-958e of code word array 952.

Once a complete set of samples has been stored in all of the positions of the sample registers 1012b-1012e, and a complete codeword has been stored in codeword registers/multipliers 1014b-1014e, the codeword registers/multipliers 1014b-1014e perform a bit-position-wise multiplication of the sample values in the sample registers 1012b-1012e by the corresponding codeword values in the codeword registers/multipliers 1014b-1014e, and supply the results to the corresponding summers 1016b-1016e.

Figure 10:
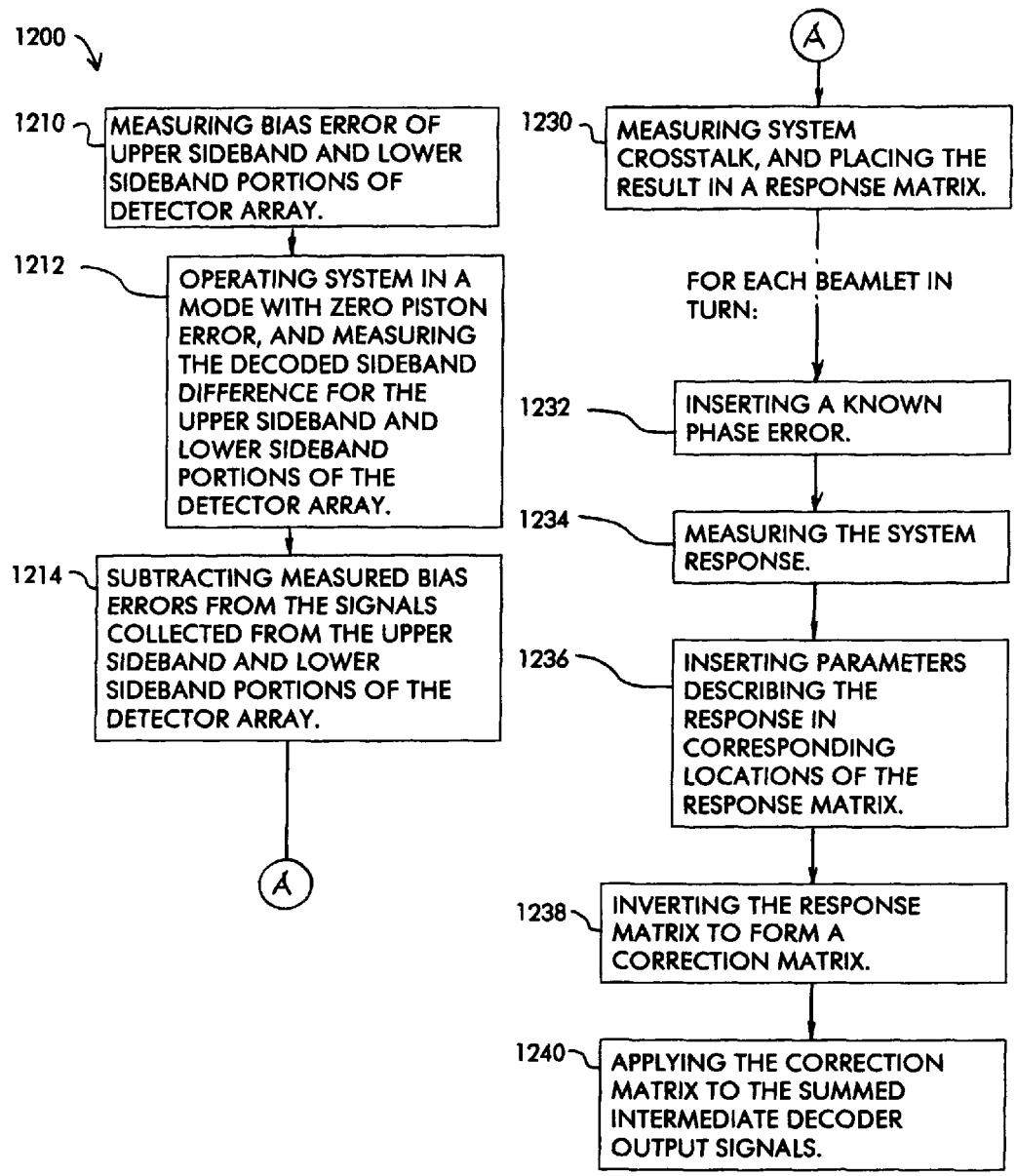
FIG. 10 is a flow diagram showing a method 1200 for use in conjunction with the laser system 100 of FIGS. 1 and 4-8 for minimizing crosstalk and other error arising from the use of square-law, non-spatially differentiated detection.

Consider, for example, the uppermost of the piston error decode matrices shown in FIG. 10, assigned to decode the piston error contributed by intermediate beamlet 122b, and including sample register 1012b, codeword register/multiplier 1014b, and summer 1016b. For each of the eight sample or code word bit positions in sample register 1012 and codeword register/multiplier 1014b, the codeword register/multiplier 1014b multiplies the corresponding accumulated sample value by the corresponding code word bit value, and furnishes this product to summer 1016b on a multiplier output signal bus 1022bb. Thus, the codeword register/multiplier 1014b performs eight multiplications, and the summer 1016b receives therefrom eight multiplication products. The summer 1016b determines the sum of the products and produces an intermediate decoded phase error contribution signal 1076b. This signal 1076b is termed "intermediate" in that a crosstalk correction may subsequently be applied to the signal by a transformation unit 1074 (described further in greater detail) before further processing outside of the matrix decoding system 838.

The codeword register/multiplier 1014b and the summer 1016b effectively calculate the inner (dot) product of the bitwise-collected samples of the combined output beam piston error and the bits of code word 958b used to modulate beamlet 122b. As noted earlier, a property of Hadamard code words is orthogonality: the inner product of any two non-identical Hadamard code words is zero. Thus, the calculated inner product furnished by summer 1016b represents nearly exclusively the piston error contributed by beamlet 122b. Because each of the other non-reference beamlets 122c-122e is modulated using a different Hadamard code word, the inner products of code word 958b and the piston error contributions of the other beamlets, which are modulated by such other code words, is nearly zero. Thus, decode matrix selects the piston error contribution of beamlet 122b, and rejects the piston error contributions of the other beamlets 122c-122e.

After the sum of products has been furnished to the transformation unit 1074, and responsive to the CLRF signal 920, sample register 1012b is cleared so that it may accept samples for the next frame. The codeword register/multiplier 1014b may be cleared at the same time.

A similar process occurs in each of the other piston error decode matrices, respectively employing sample registers 1012c-1012e, codeword registers/multipliers 1014c-1014e, and summers 1016c-1016e, producing intermediate decoded phase error contribution signals 1076c-1076e.

The use of orthogonal Hadamard code words allows an arbitrary number of beamlet errors to be processed at the same time with an acceptable or correctable amount of crosstalk. Although the orthogonality of the Hadamard code words suggests that the piston error components contributed by the other beamlets might be completely rejected, in practice, there will likely be some crosstalk as a result of a number of factors, including the detection arrangement, which employs square-law detectors and measures total energy in each sideband (as opposed to interferometry or other technical solutions), detector noise, conversion error, arithmetic precision error, and the time-varying nature of the piston error components. However, it is believed that such crosstalk will be quite small, and even in the presence of crosstalk, the servo loops will still drive piston error to zero, but at a slower rate. It was found by analysis and numerical modeling of an embodiment that there is a fixed, small crosstalk error that is correctable by performing linear transformation on the Hadamard outputs. Other approaches to minimize the effect of crosstalk could also be used. For example, an alternative solution is to modulate each beamlet in sequence, alone rather than simultaneously, so that encoded/modulated samples from only one beamlet are presented to the decoder at a time. However, this alternative would result in a reduction in the servo loop bandwidth.

In order to correct the crosstalk error, all of the intermediate decoded phase error contribution signals 1076b-1076e are supplied to a transformation unit 1074, which applies a crosstalk correction to the signals 1076b-1076e and produces corresponding final decoded phase error contribution signals 856b-856e. By way of example, but not limitation, the transformation unit 1074 applies an orthogonal, linear transformation on the intermediate signals 1076b-1076e by effectively performing a matrix multiplication of these signals by a correction matrix supplied by a calibration parameter generator 1070 over a signal path 1072. The correction matrix parameters may be developed or calibrated by applying a small known phase error, in turn, to each non-reference beamlet 122b-122e, observing the results, and storing them in a result matrix. The result matrix is then inverted and normalized, such that its determinant is 1, to produce the correction matrix. An example method for performing this calibration is described further in connection with FIG. 10.

Figure 8:
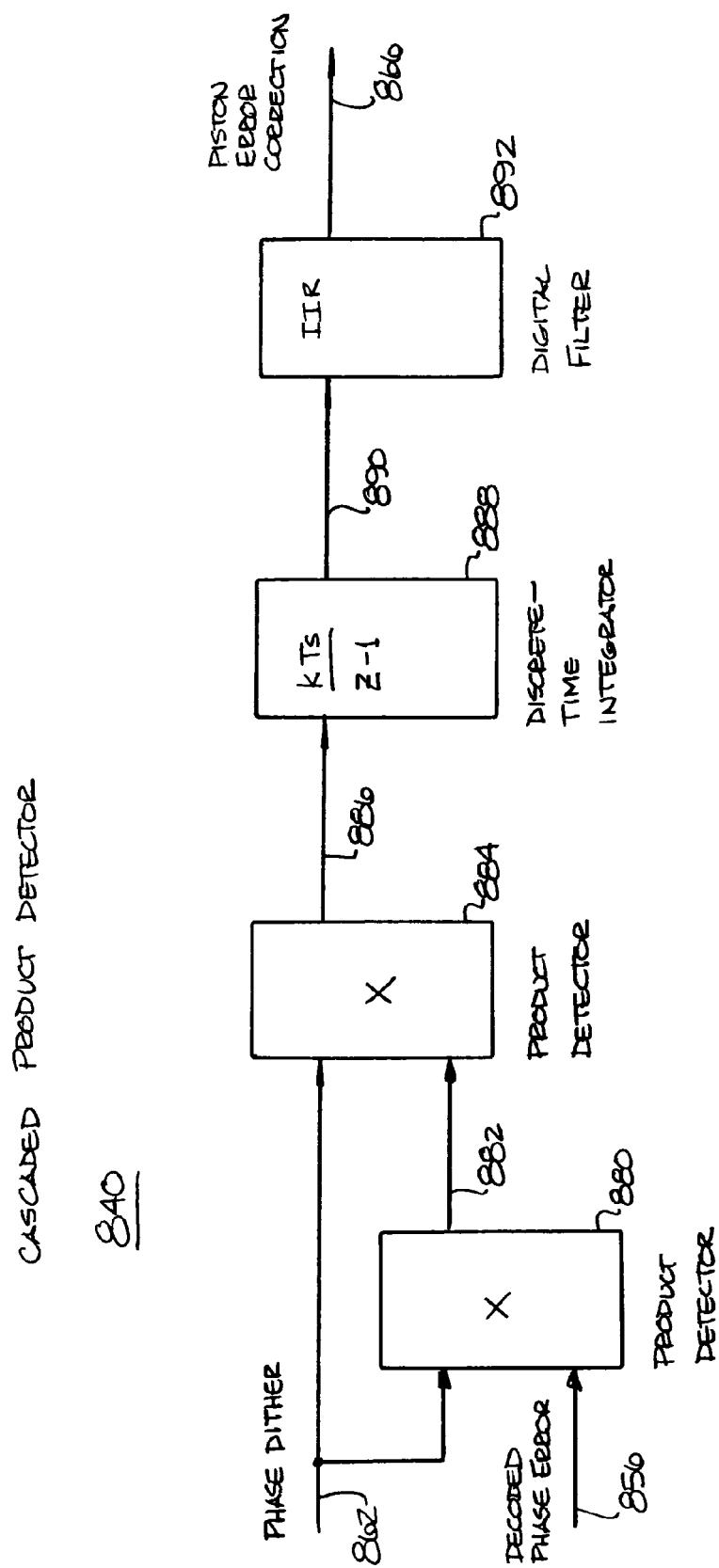
FIG. 8 is a block diagram showing an example cascaded product detector circuit for use with the coding and correction signal generation subpart 830 of FIG. 7.

For each of the non-reference beamlets 122b-122e the respective decoded piston error contribution signal 856b-856e produced by the transformation unit 1074 is furnished to a corresponding one of the cascaded product detector units 840b-840e. Each of the decoded piston error contribution signals 856b-856e is an oscillating signal, which represents piston error in the corresponding beamlet 122b-122e by the phase of such signal as compared to the phase dither signal 862b-862e. FIG. 8 is a block diagram of an example cascaded product detector unit 840. As best seen in FIG. 8, the cascaded product detector 840 receives the phase dither signal 862 from phase dither generator 860 and the decoded phase error contribution signal 856. The phase dither signal 862 is provided to first and second product detectors 880 and 884. The decoded phase error contribution signal 856 is provided to the first product detector 880, and the resulting output signal 882 is provided to the second product detector 884. Thus, the first and second product detectors are cascaded. The output signal 886 is provided to a discrete time integrator 888. Any suitable integrator could be used, and the integrator may have a gain, e.g., in the range of 1500-2500. The output signal from the integrator is furnished to a low-pass filter 892. Any suitable low-pass filter with good skirt rejection could be used to implement filter 892. For example but without limitation, filter 892 may be a digital infinite impulse response (IIR), low-pass, 8-pole elliptical filter with a cut-off frequency around 0.1 times the Nyquist frequency of the sampling system. Other filter designs which offer good skirt rejection may also be used; it is believed that cut-off frequencies up to around 0.2 s time the Nyquist frequency of the sampling system could be useable. The odd-ganged product detector advantageously allows the piston error detection and processing unit 144 to detect the sign of the phase error, despite the use of square-law optical detector in detector array 730. The output of digital filter 892 is an estimated piston error correction signal 866, corresponding to a particular beamlet. The output of each of the cascaded product detector units 840b-840e is supplied to a corresponding summer 864b-864e where a small amount of phase dither from phase dither signal 862b-864e is added. The output of summer 864b-864e is a phase error modulator control signal provided to phase modulators 142b-142e via bus 174. The phase modulators provide a phase delay rate proportional to the magnitude of the control signals, and consistent with the sign thereof, forming a "Type I" servo loop. The update rate of the servo loop is the frame rate determined by the clock generator. One frame is equivalent to eight code word bits, which, in turn, is equivalent to 64 minor cycles. The servo loop bandwidth is typically 0.1 times the reciprocal of the frame rate.

Although the processing of piston error contributed by four non-reference beamlets is described herein, a larger number of beamlets than four could be accommodated in a straightforward manner. It would be necessary to lengthen the code words so that additional orthogonal code words could be generated. The width of code word array 952, sample registers 1012b-1012e, and codeword registers/multipliers 1014b-1014e would also be enlarged to accommodate the longer code words. In addition, the depth of code word array 952, and the number of piston error decode matrices, would be enlarged to accommodate the additional number of code words to be decoded.

The use of amplitude modulation for beam tagging results in a smaller adverse impact on far-field beam quality than other possible beam tagging methods. Although a small phase dither is also introduced, the amount of dither is sufficiently small that the resulting degradation of the far-field beam quality is negligible.

Figure 9:
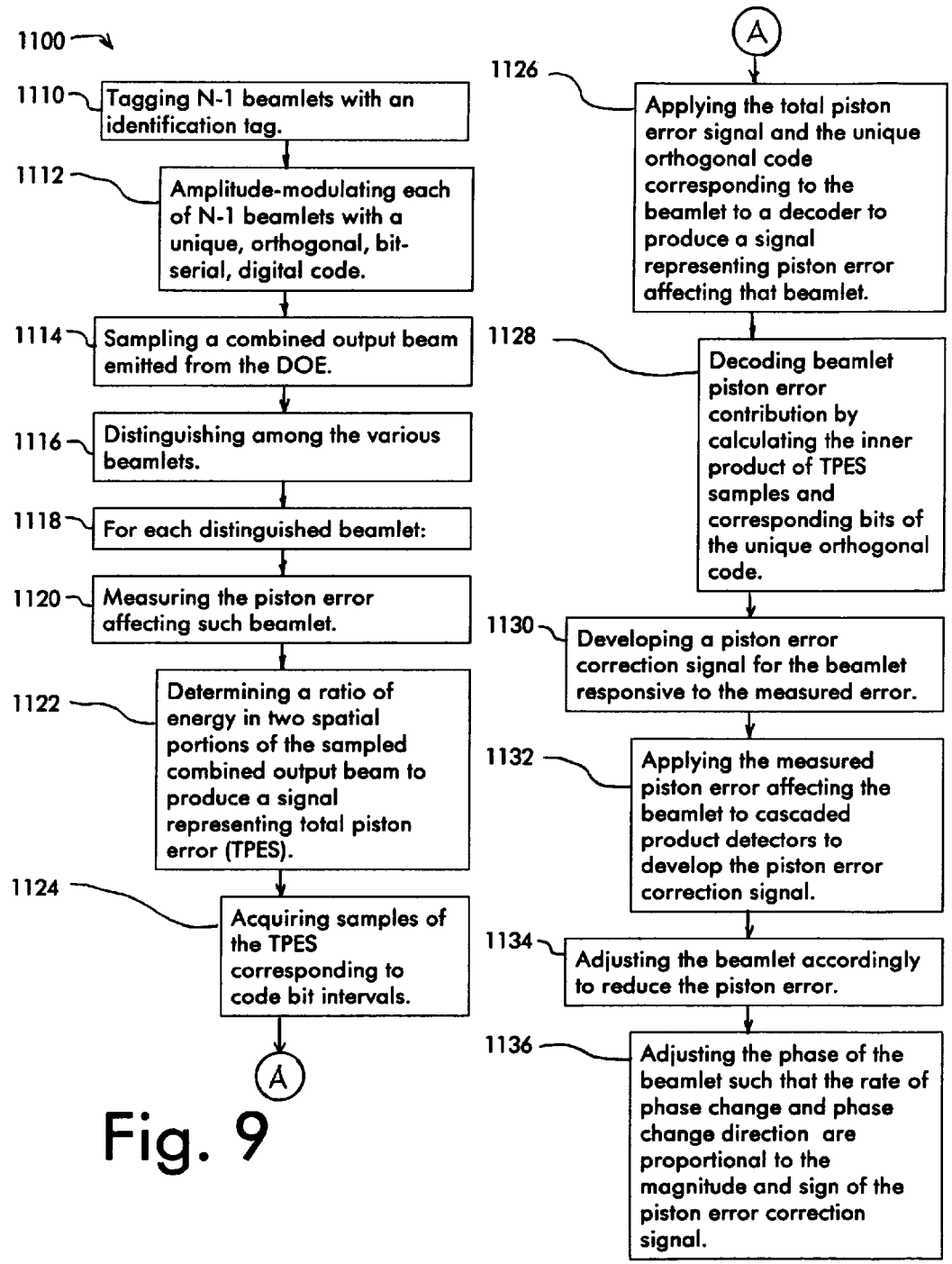
FIG. 9 is a flow diagram showing a method 1100 for use in conjunction with the laser system 100 of FIGS. 1 and 4-8 in controlling piston error.

In accord with a further aspect of the present invention, FIG. 9 is a flow diagram of a method 1100 for use with the laser system 100 for use in controlling piston error. One of skill in the art will appreciate that the method may be used with the apparatus of FIGS. 1 and 4-8, but could also be used with other apparatus and with other beamlet tagging techniques without departing from the spirit of the invention. Accordingly, some primary steps are presented in a generalized from that does not rely on the particular apparatus of FIGS. 1 and 4-8. It is noted in the description of certain steps and substeps that such steps may be performed by specific elements of the apparatus of FIGS. 1 and 4-8. The association of steps and apparatus is done by way of example but not limitation, and it is to be understood that these steps could be performed by other apparatus. Moreover, optional substeps may be omitted or replaced by other specific method steps that implement or embody the function of the primary step. Although discrete steps are mentioned, it will be understood by one of skill in the art that in some embodiments, the functions defined in the steps may be performed as continuous processes.

In step 1110, the system tags each of at least N−1 beamlets with an identification tag code, or signal or the like, where N is the total number of beamlets. Because the central beamlet is assigned as a reference beamlet, then that beamlet may be defined to have zero correctible piston error, and need not be tagged.

In an optional substep 612, the tagging of step 1110 is implemented by amplitude-modulating each of the N−1 beamlets with a unique, orthogonal, bit-serial, digital code, such as a Hadamard code. Other codes and beamlet tagging or identification techniques could also be used. Steps 1110 and 1112 may be performed, for example, by clock and code generation subpart 810 of electrical processing part 164 and by AM modulators 132 of FIGS. 1 and 5-7.

In step 1114, a continuous, low-intensity sample of the combined output beam emitted from the DOE is obtained. Step 1114 may be performed, for example, by piston error sampling beam splitter 146 of FIG. 1.

In step 1116, the system distinguishes among the various beamlets. In step 1118, beamlets are selected or isolated for further processing. Subsequent steps are performed with respect to each sampled beamlet, and may be performed for all beamlets in parallel, or may be performed for each beamlet in seriatim.

In step 1120, the system measures the piston error contributed by a particular beamlet, distinguishing the piston error contributed by the corresponding beamlet from that of other beamlets using the identification tag of step 1110. The term "measure" as used in connection with steps 1120, 1122, 1124, 1126, and 1128 is not intended to refer to a precise numerical value having significance outside of the piston error control system 130. Instead, the term "measure" as used here refers to developing a signal representative of the error, and containing sufficient information for the piston error control system 130 to effectively adjust or correct the piston error. Although the measuring step, as implemented by the apparatus of FIGS. 1, and 7-10, produces a signal proportional to and having the sign of the error, other implementations could use other types of signals, including non-proportional or discrete-valued signals. Although such other types of signals may not provide the performance of a proportional signal, the control achieved by such other types of signals may nonetheless minimize the piston error sufficiently for some applications. The functions of step 1120 may be performed, for example, by piston error detection and processing unit 144.

In an optional substep 1122, the measuring of step 1120 is partially implemented by determining a ratio of energy or intensity in two spatial portions of the sampled combined output beam to produce a signal representing total piston error. The functions of step 1122 may be performed, for example, by optical processing part 162 of piston error detection and processing unit 144.

In an optional substep 1124, the measuring of step 1120 is further partially implemented by acquiring samples of the total piston error signal at intervals corresponding to those during each bit of the tagging or identification code is used to modulate the beamlets. The functions of step 1124 may be performed, for example, by A/D converters 832, DSSC processing unit 460, and DSSC sample and hold accumulator 474 thereof, of FIGS. 4, 5, and 7.

In an optional substep 1126, the measuring of step 1120 is further partially implemented by applying the total piston error signal and the unique orthogonal code corresponding to the distinguished beamlet to a decoder to produce a signal representing piston error affecting or contributed by that beamlet. The functions of step 1126 may be performed, for example, by matrix decoding system 838 of FIGS. 5 and 7.

In an optional substep 1128, the process of producing a signal representing piston error contributed by a beamlet of step 1126 is partially implemented by decoding the tagging or identification signal which have been used to modulate the beamlet and which now encodes the piston error contribution of the beamlet within the total piston error signal. This is performed by calculating the inner product of the bits of the unique orthogonal code used to modulate the beamlet during one code word frame, with the total piston error signal samples acquired at the time those bits were used. The functions of step 1128 may be performed, for example, by sample registers 1012*b*-1012*e*, codeword registers/multipliers 1014*b*-1014*e*, and summers 1016*b*-1016*e* of FIG. 7.

In step 1130, the system develops a piston error correction signal for the beamlet responsive to the measured error. In an optional substep 1132, the error correction signal development of step 1130 may be implemented by applying the measured piston error affecting the beamlet to a cascaded product detector unit to develop the piston error correction signal. The function of step 1132 may be performed, for example, by cascaded product detectors 840*b*-840*e* of FIGS. 5 and 7.

In step 1134, the system adjusts the beamlet in accord with the piston error correction signal of step 1130 to reduce the piston error contributed by that beamlet. In an optional substep 1136, the adjusting of step 1134 may be implemented by adjusting phase of the beamlet such that the rate of change and change direction is proportional to the magnitude and sign of the piston error correction signal. The function of steps 1134 and 1136 may be performed, for example, by phase modulators 142*b*-142*e* which can introduce a phase delay in non-reference beamlets 122*b*-122*e* and thereby adjust the phase of the beamlet with respect to the reference beamlet 122*a*.

The steps or operations described herein are just for example. There may be many variations to these steps or operations without departing from the spirit of the invention. For instance, the steps may be performed in a differing order, or steps may be added, deleted, or modified.

In accord with a further aspect of the present invention, FIG. 10 is a flow diagram of a method 1200 for use with the laser system 100 for use in calibrating and using detector bias error correction in the DSSC processing unit 460 and in calibrating and using a transformation unit 1074 of the matrix decoding system 838. One of skill in the art will appreciate that the method may be used with the apparatus of FIGS. 1 and 4-8, but could also be used with other apparatus and with other beamlet tagging techniques without departing from the spirit of the invention. Accordingly, some primary steps are presented in a generalized from that does not rely on the particular apparatus of FIGS. 1 and 4-8. It is noted in the description of certain steps and substeps that such steps may be performed by specific elements of the apparatus of FIGS. 1 and 4-8. The association of steps and apparatus is done by way of example but not limitation, and it is to be understood that these steps could be performed by other apparatus. Moreover, optional substeps may be omitted or replaced by other specific method steps that implement or embody the function of the primary step. Although discrete steps are mentioned, it will be understood by one of skill in the art that in some embodiments, the functions defined in the steps may be performed as continuous processes.

Steps 1210-1214 are directed to the calibration and use of detector bias correction facilities, and may, by way of example but not limitation, be performed in or by DSSC processing unit 140. These steps may be performed in conjunction with steps 1230-1240, or independently thereof, and may further be considered optional, in that bias error could, in some embodiments be adequately minimized by selecting appropriate detectors and processing circuits. In step 1210, the bias error of the upper sideband and lower sideband portions of the detector array is measured. In optional substep 1212, the measuring of step 1210 may be performed by operating the system 100 in a mode with zero piston error and measuring the decoded sideband difference between for the upper sideband and lower sideband portions of the array. In step 1414, the measured bias errors are subtracted from the corresponding signals collected from the upper sideband and lower sideband portions of the detector array.

Steps 1230-1240 are directed to the calibration and use of facilities for transforming the output signals from the decoder matrices to minimize crosstalk, and may by way of example but not limitation, be performed in or by calibration parameter generator 1070 and transformation unit 1074. (See FIG. 7). These steps may be performed in conjunction with steps 1210-1214, or independently thereof. These steps may further be considered optional, in that the crosstalk these steps would correct could, in some embodiments be tolerable even without correction, or could be minimized by selecting, one-at-a-time, each non-reference beamlet, and tagging and decoding the piston error contribution of each beamlet independently of all other beamlets.

In step 1230, system crosstalk is measured and placed in a response matrix. In optional substeps 1232, 1234, and 1236, the measuring and placing of step 1230 may be performed, for each non-reference beamlet in turn, as follows: In substep 1232, a known phase error (e.g., a delay) is inserted into a subject beamlet. In substep 1234, the system response to the known phase error in the subject beamlet is measured. In substep 1236, parameters describing the measured system response are inserted in corresponding locations of a response matrix. The execution of substeps 1232-1236 with respect to each of the non-reference beamlets produces a response matrix that describes the response of the system with respect to the known phase error in all of the non-reference beamlets.

In step 1238, the response matrix is inverted to form a correction matrix. The correction matrix may be further normalized so that its determinant is 1. In step 1240, the correction matrix is applied to the intermediate decoder output signals produced by the decoder matrices 1012b-1012e of matrix decoding system 838. This may be accomplished by performing a matrix multiplication of a column vector representing the intermediate decoder output signals by the correction matrix, e.g., in transformation unit 1074. Apparatus organized in another manner could perform an analogous or equivalent operation. This step produces crosstalk-corrected output signals 856b-856e, which are supplied by the matrix decoding system 838 to the ganged product detectors 840b-840e.

Thus, there has been described an improved high-power laser system which includes a laser master oscillator, a plurality of fiber laser amplifiers producing intermediate output beamlets, a diffractive optical element for combining the intermediate beamlets into a combined output beam, and one or more error controllers for minimizing errors related to beam combination that may degrade the quality of the combined output beam. A diffractive optical element (DOE) is a special type of coarse grating having a specifically designed grating profile or shape, which is capable of combining the plurality of intermediate beamlets into a single combined output beam. Each of piston error and tilt error, if present, causes the emission from the DOC of undesired secondary beamlets which rob power from and reduce the quality of the desired primary combined output beam.

A piston error controller provides for each intermediate beamlet a unique tagging signal with which the beamlet is amplitude-modulated prior to combining. The tagging signal allows the contribution of each beamlet to piston error artifact in the combined output signal to be distinguished from that of other beamlets. The piston error controller obtains a sample of the combined output beam, and produces a double-sideband suppressed-carrier optical signal representing the piston error. The optical signal is captured by a detector, decoded to distinguish among contributions from the various beamlets, and for each non-reference beamlet, generates an error control signal proportional to the measured the piston error. Each error control signal is used to control a corresponding phase modulator. The tagging signal may be produced by associating with each beamlet one or more unique code words or vectors from a Hadamard dictionary A unique dithering signal is also provided to phase modulate the beamlet before combination. The phase dithering is done at a very low level to avoid degrading the output beam's far-field pattern. The phase dithering allows recovery of the sign or direction of the phase error.

The piston error control system advantageously minimizes the production of secondary beamlets exiting the DOE beam combiner, thereby maximizing the energy in the primary combined output beam and improving beam quality. The piston error control system is relatively resistant to crosstalk among beamlets, but due to the nature of the controllers as first-order servo-loops, the error will eventually converge to zero despite the crosstalk, albeit perhaps at a slower rate.

Although this invention has been described as it could be applied to a laser system employing fiber laser amplifiers with intermediate beamlets combined by a DOE beam combiner, these are merely examples of ways in which the invention may be applied. The invention is not limited to these examples, and could be applied to many other environments.

The embodiments described herein are exemplary. Thus it will be appreciated that although the embodiments are described in terms of specific technologies, other equivalent technologies could be used to implement systems in keeping with the spirit of the present invention.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A laser system comprising:
   a plurality of laser sources each producing a respective beamlet to form a plurality of respective beamlets, one of said plurality of respective beamlets being definable as a reference beamlet, and all other beamlets of said plurality of respective beamlets being definable as non-reference beamlets via an array detector;
   a diffractive optical element (DOE) optically coupled to said laser sources for combining said plurality of respective beamlets into an output beam;
   each of said non-reference beamlets exhibiting a respective piston error characteristic, said piston error characteristics producing piston error artifacts in said output beam;
   a piston error controller adapted to measure said piston error artifacts in said output beam and produce a coded correction signal using a code generator related to said piston error characteristic of one of said non-reference beamlets; and
   a phase modulator interposed in said one of said non-reference beamlets for minimizing said piston error characteristic responsive to said correction signal.

2. The system of claim 1 wherein said piston error controller comprises:
   a code generator adapted to produce a respective unique, mutually orthogonal code for each of said non-reference beamlets;
   for each of said non-reference beamlets, a modulator interposing said respective code thereon;
   a detector system for obtaining a signal derived from said output beam and including information of said piston error artifacts; and
   a decoder responsive to said signal and adapted to measure for each of said non-reference beamlets the piston error artifact produced as a result of the piston error characteristic of such beamlet as distinguished from those of all other beamlets and to produce the correction signal.

3. The system of claim 2 wherein said detector system is interferometer-free.

4. The system of claim 1, further comprising a signal generator producing a phase dither signal, wherein said phase modulator is further responsive to said phase dither signal for imposing phase dither on said non-reference beamlets, said phase dither exhibiting a frequency that is the same as that of phase dither imposed on any other non-reference beamlets.

5. The system of claim 2, said detector system comprising:
   a beam sampler for obtaining a low-intensity sample of said output beam;
   a detector for obtaining first and second signals proportional to beamlet components respectively associated with upper and lower sidebands of said output beam; and
   a processor for producing a signal representing the normalized difference of the intensities of said beamlet components associated with said upper and lower sidebands of said output beam.

6. The system of claim 2 further comprising:
a signal generator producing a phase dither signal; and
wherein said decoder further comprises for each of said beamlets:
a first product detector responsive to a signal representing said measured piston error artifact and said phase dither signal to produce a first detector output signal;
a second product detector responsive to said first detector output signal and said phase dither signal to produce a second detector output signal.

7. The system of claim 2 wherein said decoder further comprises:
a linear transformer responsive to said measured piston error artifact produced as a result of the piston error characteristic of such beamlet as distinguished from those of all other beamlets to apply a crosstalk correction to said respective piston error correction signal.

8. The system of claim 7 wherein said linear transformer is further responsive to an inverse of measured system response to known phase error to apply said crosstalk correction.

9. A method of operating a laser comprising:
producing a plurality of laser beamlets, one of said beamlets being definable as a reference beamlet, and all other beamlets being definable as non-reference beamlets via an array detector;
combining said beamlets via a diffractive optical element (DOE) into an output beam, wherein each of said non-reference beamlets exhibit a respective piston error characteristic and said piston error characteristics produce piston error artifacts in said output beam;
measuring said piston error artifacts in said output beam and producing a coded correction signal using a code generator related to said piston error characteristic of one of said beamlets; and
minimizing said piston error characteristic by phase-modulating said beamlet responsive to said correction signal.

10. The method of claim 9 further comprising:
producing a respective unique, mutually orthogonal code for each of said non-reference beamlets;
for each of said non-reference beamlets, imposing said respective code thereon;
obtaining a signal derived from said output beam and including information of said piston error artifacts; and
for each of said non-reference beamlets, measuring, responsive to said signal, the piston error artifact produced as a result of the piston error characteristic of such beamlet as distinguished from those of all other beamlets and to produce a respective piston error correction signal.

11. The method of claim 10 wherein said obtaining step is performed by interferometer-free apparatus.

12. The method of claim 10, further comprising:
obtaining a low-intensity sample of said output beam;
responsive to said sample, obtaining first and second signals proportional to beamlet components respectively associated with upper and lower sidebands of said output beam; and
producing a signal representing the normalized difference of the intensities of said beamlet components associated with said upper and lower sidebands of said output beam.

13. The method of claim 9, further comprising a producing a phase dither signal, and, responsive thereto, imposing phase dither on said beamlet, said phase dither exhibiting a frequency that is the same as that of phase dither imposed on any other non-reference beamlets.

14. The method of claim 9 further comprising:
producing a phase dither signal; and
for each of said beamlets, responsive to said measured piston error artifact and said phase dither signal, applying product detection to produce a first detector output signal, and responsive to said first detector output signal and said phase dither signal, applying product detection to produce a second detector output signal.

15. The method of claim 10 further comprising, for each of said non-reference beamlets, applying a crosstalk correction in producing said respective piston error correction signal.

16. The method of claim 11 further comprising:
measuring system crosstalk;
determining an inverse of the measured system crosstalk; and
applying said determined inverse of the measured system crosstalk to correct crosstalk affecting said respective piston error correction signal.

17. A method for controlling an error characteristic in a laser system comprising the steps of:
tagging a plurality of beamlets from a detector array produced by laser amplifiers prior to beam combination with an identification tag using a code generator;
sampling a combined output beam resulting from combining said plurality of beamlets via a diffractive optical element;
from said sampled combined output beam, measuring a piston error affecting one of said beamlets distinct from piston errors affecting any other of said beamlets;
generating an error correction signal to reduce said piston error of one of said beamlets responsive to said measured piston error; and
adjusting a physical characteristic of said one beamlet accordingly to reduce the piston error.

18. The method of claim 17 wherein said measuring step is performed by interferometer-free apparatus.

19. The method of claim 17 wherein said tagging step thereof further comprises amplitude modulating during a period each of said plurality of beamlets with a unique code word orthogonal to any of the code words used to modulate any of the other beamlets during said period.

20. The method of claim 17 wherein said measuring step thereof further comprises applying the sampled combined output beam and the unique code word corresponding to said beamlet to a decoding system.

21. The method of claim 17 wherein said measuring step thereof further comprises determining a ratio of energy in two spatial portions of the sampled combined output beam to produce a signal representing total piston error.

22. The method of claim 21 wherein said measuring step thereof further comprises:
acquiring periodic samples of the signal representing total piston error corresponding in time to elements of the unique code word corresponding to the beamlet;
applying the signal representing total piston error samples and a unique code word corresponding to the beamlet to a decode matrix; and
for each temporal instance of the unique code word, calculating the inner product of said code word and those periodic total piston error signal samples corresponding in time to such instance to produce said measurement of the piston error affecting said beamlet.

23. The method of claim 22 wherein said generating step thereof further comprises applying the measured piston error affecting said one beamlet to cascaded product detectors develop the piston error correction signal.

24. The method of claim 22 wherein said adjusting step thereof further comprises adjusting phase of said one beamlet such that the rate of phase change and phase change direction are proportional to the magnitude and sign of the piston error correction signal.

25. The method of claim 17 further comprising applying a crosstalk correction to said measured piston error affecting one of said beamlets distinct from piston errors affecting any other of said beamlets in generating said error correction signal.

* * * * *